United States Patent
Francis

(10) Patent No.: US 11,237,073 B2
(45) Date of Patent: *Feb. 1, 2022

(54) EMBEDDED RETURN WIRE TIME DOMAIN REFLECTOMETRY PIPELINE FAULT DETECTION SYSTEMS AND METHODS

(71) Applicant: Trinity Bay Equipment Holdings, LLC, Houston, TX (US)

(72) Inventor: Kirk Spencer Francis, Richmond, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/233,607

(22) Filed: Apr. 19, 2021

(65) Prior Publication Data

US 2021/0285839 A1  Sep. 16, 2021

Related U.S. Application Data

(63) Continuation of application No. 16/818,730, filed on Mar. 13, 2020, now Pat. No. 11,022,514.

(51) Int. Cl.
*G01M 3/14* (2006.01)
*G01M 3/02* (2006.01)

(52) U.S. Cl.
CPC ............ *G01M 3/022* (2013.01); *G01M 3/143* (2013.01)

(58) Field of Classification Search
CPC ...... G01M 3/022; G01M 3/045; G01M 3/165; G01M 3/18; G01M 3/182; G01M 3/40; G01M 5/025; G01M 5/005–0058; G01M 5/0075; G01M 5/0083
See application file for complete search history.

(56) References Cited

U.S. PATENT DOCUMENTS

| 4,450,711 A | 5/1984 | Claude |
| 4,797,621 A | 1/1989 | Anderson et al. |
| 5,134,377 A | 7/1992 | Reddy et al. |
| 5,172,730 A | 12/1992 | Driver |

(Continued)

OTHER PUBLICATIONS

R. Araneo, S. Celozzi, F. Maradei, G. Potini, Fault Detection in Conductive Pipelines by Time Domain Reflectometry, Department of Electrical Engineering, Sep. 15-17, 2005, pp. 134-138.

(Continued)

*Primary Examiner* — Alexander A Mercado
(74) *Attorney, Agent, or Firm* — Conrad J. Hsu

(57) ABSTRACT

Techniques for implementing and/or operating a testing system that includes a pipe segment, which includes tubing having an inner layer that defines a pipe bore, an intermediate layer including electrically conductive material implemented around the inner layer, and an outer layer implemented around the intermediate layer, and a return wire embedded within the tubing. The testing system includes a signal generator that supplies an electrical test signal to the electrically conductive material, a sensor electrically coupled to the return wire, in which the sensor determines a sensor signal indicative of an actual electrical return signal received from the return wire in response to supply of the electrical test signal, and a control sub-system communicatively coupled to the signal generator and the sensor, in which the control sub-system determines an integrity state of a pipeline in which the pipe segment is deployed based at least in part on the sensor signal.

18 Claims, 8 Drawing Sheets

(56) References Cited

U.S. PATENT DOCUMENTS

| | | |
|---|---|---|
| 5,410,255 A | 4/1995 | Bailey |
| 5,551,484 A | 9/1996 | Charboneau |
| 6,171,025 B1 | 1/2001 | Langner et al. |
| 6,265,880 B1 | 7/2001 | Born et al. |
| 6,634,388 B1 | 10/2003 | Taylor et al. |
| 10,677,394 B2 | 6/2020 | Ethridge et al. |
| 10,739,225 B1 | 8/2020 | Francis et al. |
| 2002/0038199 A1 | 3/2002 | Blemel |
| 2004/0098212 A1 | 5/2004 | Hong et al. |
| 2005/0062487 A1 | 3/2005 | Strackbein et al. |
| 2006/0086197 A1 | 4/2006 | Chen et al. |
| 2006/0196252 A1 | 9/2006 | Deckard |
| 2006/0289074 A1 | 12/2006 | Eriksson et al. |
| 2007/0021941 A1 | 1/2007 | Blemel |
| 2012/0027927 A1 | 2/2012 | Raymond |
| 2012/0098555 A1 | 4/2012 | Raymond |
| 2012/0170610 A1 | 7/2012 | Ramos et al. |
| 2013/0154666 A1 | 6/2013 | Albaladejo et al. |
| 2014/0069542 A1 | 3/2014 | Graham et al. |
| 2014/0115887 A1 | 5/2014 | Raymond |
| 2014/0130350 A1 | 5/2014 | Raymond |
| 2014/0345740 A1 | 11/2014 | Demanze |
| 2015/0285705 A1 | 10/2015 | Kumar et al. |
| 2016/0266001 A1 | 9/2016 | McNab et al. |
| 2017/0089302 A1 | 3/2017 | Jones |
| 2018/0246048 A1 | 8/2018 | Sakunenko et al. |
| 2018/0320826 A1 | 11/2018 | Ethridge et al. |
| 2019/0011324 A1 | 1/2019 | Nelson |
| 2019/0049333 A1 | 2/2019 | Graham et al. |

OTHER PUBLICATIONS

Zsigmond M. Pal, Ronald H. Johnston, Simulation of Pipeline Holiday Detection by Time Domain Reflectometry, IEEE Transactions on Industry Applications, Sep./Oct. 1990, vol. 26, No. 5.

RJM Equipment Sales, Inc, Radiodetection, Application Guide, pp. 41.

Christoph Von Der Ahe, Ludger Overmeyer, Examination of Time Domain Reflectometry for Fault Locating in Pipelines, Automated Systems & Technologies, May 25-26, 2015, pp. 82-86, St. Petersburg, Russia.

The International Search Report and the Written Opinion of the International Searching Authority for PCT/US2021/022180 dated May 26, 2021.

EMBEDDED RETURN WIRE TIME DOMAIN REFLECTOMETRY PIPELINE FAULT DETECTION SYSTEMS AND METHODS

CROSS-REFERENCE

The present disclosure is a continuation of U.S. patent application Ser. No. 16/818,730, entitled "EMBEDDED RETURN WIRE TIME DOMAIN REFLECTOMETRY PIPELINE FAULT DETECTION SYSTEMS AND METHODS" and filed Mar. 13, 2020, which is incorporated herein by reference in its entirety for all purposes.

BACKGROUND

The present disclosure generally relates to pipeline systems and, more particularly, to a testing system that may be implemented and/or operated to facilitate testing the integrity of a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments, for example, in addition to one or more pipe (e.g., midline and/or end) fittings (e.g., connectors) used to couple a pipe segment to another pipe segment, to a fluid source, and/or to a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid.

However, at least in some instances, the presence of one or more faults (e.g., defects), such as a breach, a kink, and/or a dent, on pipe segment tubing may affect (e.g., reduce and/or compromise) its integrity and, thus, its ability to provide isolation (e.g., insulation). In other words, at least in some instances, operating a pipeline system while a pipe segment deployed therein has an integrity compromising fault may affect (e.g., reduce) operational efficiency and/or operational reliability of the pipeline system, for example, due to the fault resulting in conveyed fluid being lost and/or contaminated by external environmental conditions. As such, to facilitate improving pipeline system operational efficiency and/or operational reliability, the integrity of a pipeline system may be tested.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a testing system includes a pipe segment, in which the pipe segment includes tubing having an inner layer that defines a pipe bore, an intermediate layer comprising electrically conductive material implemented around the inner layer to define a fluid conduit, and an outer layer implemented around the intermediate layer and a return wire embedded within the tubing of the pipe segment. Additionally, the testing system includes a signal generator electrically coupled to the electrically conductive material in the intermediate layer of the tubing, in which the signal generator supplies an electrical test signal to the electrically conductive material in the tubing of the pipe segment, a sensor electrically coupled to the return wire embedded within the tubing of the pipe segment, in which the sensor determines a sensor signal indicative of an actual electrical return signal received from the return wire embedded within the tubing of the pipe segment in response to supply of the electrical test signal to the electrically conductive material in the intermediate layer of the tubing, and a control sub-system communicatively coupled to the signal generator and the sensor, in which the control sub-system determines an integrity state of a pipeline in which the pipe segment is deployed based at least in part on the sensor signal indicative of the actual electrical return signal received from the return wire embedded within the tubing of the pipe segment.

In another embodiment, a method of implementing a testing system to be used to test integrity of a pipeline including implementing an inner layer of pipe segment tubing to be deployed in the pipeline to define a pipe bore that enables fluid flow through the pipe segment tubing, implementing an intermediate layer of the pipe segment tubing at least in part by disposing electrically conductive material around the inner layer of the pipe segment tubing to define a fluid conduit through the intermediate layer and to enable an electrical test signal to be supplied to the intermediate layer to facilitate testing the integrity of the pipeline, implementing an embedded return wire to be used to return an electrical return signal that results from supply of the electrical test signal to the intermediate layer of the pipe segment tubing to facilitate testing the integrity of the pipeline at least in part by disposing the embedded return wire within the fluid conduit defined in the intermediate layer of the pipe segment tubing, and implementing an outer layer of the pipe segment tubing around at least the intermediate layer of the pipe segment tubing and the embedded return wire.

In another embodiment, pipe segment tubing to be deployed in a pipeline system includes a tubing inner layer that defines a pipe bore that provides a flow path through the pipe segment tubing, a tubing outer layer, and a tubing annulus implemented between the tubing inner layer and the tubing outer layer. The tubing annulus includes electrically conductive material to be electrically coupled to a signal generator to enable an electrical test signal to be supplied to the tubing annulus to facilitate testing integrity of the pipeline system in which the pipe segment tubing is deployed and an embedded return wire disposed between the electrically conductive material, in which the embedded return wire is electrically coupled to a sensor to enable the integrity of the pipeline system in which the pipe segment tubing is deployed to be tested based at least in part on an electrical return signal returned via the embedded return wire in response to supply of the electrical test signal to the electrically conductive material in the tubing annulus.

DETAILED DESCRIPTION

Figure 1:
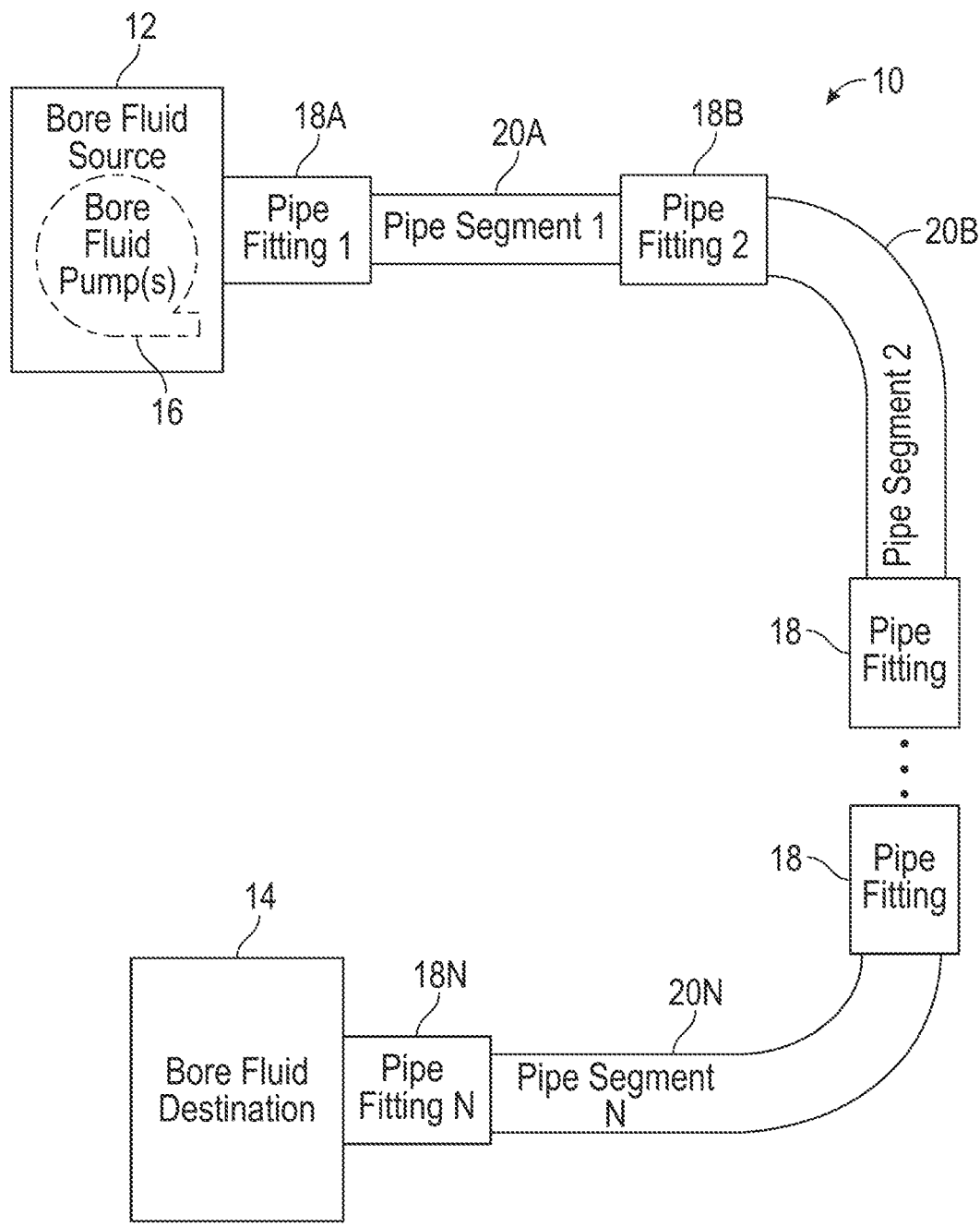
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. More specifically, a pipe segment may generally be secured and sealed in one or more pipe fittings to facilitate fluidly coupling the pipe segment to another pipe segment, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing, which defines (e.g., encloses) a pipe bore that provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate providing fluid isolation, in some instances, the tubing of a pipe segment may be implemented with multiple layers. For example, the tubing of a pipe segment may include an inner (e.g., innermost) layer (e.g., liner or sheath) and an outer (e.g., outermost) layer (e.g., shield or sheath) that each run (e.g., span) the length of the pipe segment. To facilitate blocking fluid flow directly therethrough, the inner layer and the outer layer may each be a continuous layer of solid material, such as plastic and/or a composite material, that runs the length of the pipe segment.

In some instances, pipe segment tubing may additionally include one or more intermediate layers implemented between its inner layer and its outer layer, for example, to facilitate improving tensile strength of the pipe segment tubing. Additionally, to facilitate improving deployment (e.g., installation) efficiency, in some instances, an intermediate layer of pipe segment tubing may include solid material, such as metal and/or a composite material, with one or more openings devoid of solid material. For example, the intermediate layer may include solid material helically wrapped (e.g., wound) on the inner layer of pipe segment tubing to facilitate defining a helically-shaped opening that runs along the pipe segment tubing. In other words, in such instances, the intermediate layer may have one or more gaps in which the solid material is not implemented and, thus, included in the annulus of the pipe segment tubing. Due to the reduced amount of solid material, at least in some instances, implementing an intermediate layer of pipe segment tubing with one or more openings may facilitate improving flexibility of the pipe segment, for example, to facilitate reducing its minimum bend radius (MBR). In fact, at least in some instances, a flexible pipe segment may be spooled (e.g., on a reel and/or in a coil) and, thus, increasing its flexibility may facilitate improving deployment efficiency, for example, by enabling the pipe segment to be transported and/or deployed using a tighter spool.

Nevertheless, in some instances, one or more faults (e.g., defects), such as a breach, a kink, and/or a dent, on pipe segment tubing may affect (e.g., compromise and/or reduce) its integrity and, thus, its ability to provide isolation (e.g., insulation) between the pipe bore of a corresponding pipe segment and environmental conditions external to the pipe segment. For example, a fault on the tubing of a pipe segment may result in excessive (e.g., undesired) fluid flow from the pipe segment directly out into environmental conditions external to the pipe segment and/or from the external environmental conditions directly into the pipe segment. In other words, at least in some instances, operating a pipeline system while pipe segment tubing deployed therein has an integrity-compromising fault may affect (e.g., reduce) operational efficiency and/or operational reliability of the pipeline system, for example, due to the fault resulting in conveyed fluid being lost and/or contaminated by external environmental conditions.

As such, to facilitate improving operational efficiency and/or operational reliability of a pipeline system, the integrity of one or more pipe segments deployed in or to be deployed in the pipeline system may be tested via an offline (e.g., initial) integrity testing process, for example, performed by an offline testing system before beginning and/or resuming operation of the pipeline system. To facilitate performing an offline integrity testing process, in some instances, one or more openings (e.g., gaps) in an intermediate layer (e.g., annulus) of pipe segment tubing may each be implemented such that it runs the length of a corresponding pipe segment, thereby providing a fluid conduit (e.g., paths) through which fluid can flow within the pipe segment tubing. For example, the intermediate layer may include one or more helically-shaped fluid conduits that run the length of the pipe segment. In fact, in such instances, an outer layer of the pipe segment tubing may facilitate isolating conditions within the tubing annulus (e.g., fluid conduit implemented in one or more intermediate layers) from environmental conditions external to the pipe segment while an inner layer of the pipe segment tubing may facilitate isolating the conditions within the tubing annulus from conditions within the pipe bore of the pipe segment. In other words, in such instances, the pipe segment may be implemented to enable fluid flow in its pipe bore as well as fluid flow in the annulus of its tubing.

Leveraging this fact, in some instances, an offline testing system and/or an offline integrity testing process may test integrity of pipe segment tubing at least in part by injecting (e.g., supplying and/or pumping) test fluid into the annulus of the pipe segment tubing and determining one or more fluid parameters that result downstream due to the test fluid injection, for example, via one or more test fluid sources (e.g., pumps and/or compressed air tanks) and one or more sensors, respectively. More specifically, a fluid parameter of the test fluid may be an upstream fluid parameter and, thus, comparison with a corresponding downstream fluid parameter may indicate the change in the fluid parameter that results from fluid flow through the annulus (e.g., fluid conduit implemented in an intermediate layer) of pipe segment tubing. As described above, pipe segment tubing may generally be implemented to provide isolation, such as thermal isolation (e.g., insulation), fluid flow isolation, and/or pressure isolation, and, thus, facilitates reducing the amount fluid parameters change due to fluid flow therein. Although some amount of change in a fluid parameter may nevertheless occur, the change may generally be predictable, for example, based at least in part on a model, empirical testing, external environmental conditions, fluid parameters of the injected test fluid, implementation parameters, such as material and/or thickness, of the pipe segment tubing, or any combination thereof.

In other words, at least in some instances, an unexpected change in downstream fluid parameters determined during an offline integrity testing process may indicate that the integrity of a pipe segment is compromised by one or more faults (e.g., defects), such as a dent, a kink, and/or a breach. In this manner, an offline testing system may perform an offline (e.g., initial) integrity testing process to facilitate testing integrity of a pipe segment, for example, before the pipe segment is used in operation of a pipeline system in which it is deployed. However, in some instances, a fault in a pipe segment that is deployed in a pipeline system may develop during operation of the pipeline system, for example, due to environmental conditions and/or inadvertent contact with the tubing of the pipe segment.

Accordingly, to facilitate further improving operational efficiency and/or operational reliability of a pipeline system, the present disclosure provides techniques for implementing and/or operating an online testing system to perform an online integrity testing process on the pipeline system, for example, periodically or continuously during operation of the pipeline system. Generally, the tubing of a non-faulty (e.g., non-defective) pipe segment may exhibit a relatively constant electrical impedance (e.g., resistance, capacitance, and/or inductance). However, when a fault is present, the fault may produce a discontinuity in the tubing of the pipe segment, which causes an electrical impedance that differs from the relatively constant impedance of non-faulty portions of the pipe segment tubing.

Leveraging this fact, an online testing system and/or an online integrity testing process may test integrity of a pipeline system at least in part by supplying an electrical test signal to electrically conductive material, such as metal, implemented in an intermediate layer of pipe segment tubing deployed therein and determining an electrical return signal that results from the transmission of the electrical test signal, for example, via one or more signal generators and one or more sensors, respectively. To facilitate determining an electrical return signal, in some embodiments, the online testing system may include a discrete return wire (e.g., cable), which is implemented to be disposed proximate to the pipeline system. In other words, in such embodiments, the discrete return wire may be implemented external to (e.g., outside of) the pipeline system and, thus, one or more pipe segments deployed in the pipeline system. However, at least in some instances, utilizing a discrete return wire may potentially limit online integrity testing efficiency, for example, due to the discrete return wire and one or more pipe segments being deployed separately in a pipeline system.

Accordingly, to facilitate improving online integrity testing efficiency, in some embodiments, a return wire may be embedded (e.g., integrated) within the tubing of a pipe segment deployed or to be deployed in a pipeline system. In particular, in some such embodiments, the embedded return wire (e.g., cable) may be implemented within a tubing annulus of a pipe segment, which is defined between an inner layer and an outer layer of the tubing of the pipe segment. As described above, in some embodiments, an intermediate layer of pipe segment tubing that is included in its tubing annulus may be implemented to facilitate defining a helically-shaped fluid conduit. Thus, in some such embodiments, an embedded return wire may be disposed within the helically-shaped fluid conduit included in the tubing annulus, thereby implementing the embedded return wire with a helical shape.

In any case, when the tubing of a pipe segment includes an embedded return wire, an online testing system and/or an online integrity testing process may test the integrity of a pipeline system in which the pipe segment is deployed at least in part by supplying an electrical test signal to electrically conductive material implemented in an intermediate layer included in the tubing annulus of the pipe segment and determining an electrical return signal received via an embedded return wire that is implemented in the tubing annulus of the pipe segment. In other words, in such embodiments, the integrity of the pipeline system may be tested at least in part by determining an electrical signal returned from the tubing annulus of the pipe segment due to supply of the electrical test signal to the tubing annulus of the pipe segment. As described above, a fault in a pipeline system that results in a discontinuity in the pipeline system may produce a change in electrical impedance and, thus, a change in one or more electrical characteristics, such as voltage and/or current, of an electrical return signal. As such, in some embodiments, an online testing system and/or an online integrity testing process may determine an online integrity state of the pipeline system and/or one or more expected characteristics of a potential fault in the pipeline system at least in part by analyzing the profile of the electrical return signal, for example, over time.

Additionally or alternatively, to facilitate testing integrity of a pipeline system, an online testing system and/or an online integrity testing process may determine an electrical return signal that is expected to be returned by a non-faulty pipeline system, for example, based at least in part on a model, empirical testing, external environmental conditions, fluid parameters of bore fluid in the pipeline system, implementation parameters, such as material and/or thickness, of pipe segment tubing deployed in the pipeline system, or any combination thereof. In particular, in some such embodiments, the online testing system and/or the online integrity testing process may determine the online integrity state of the pipeline system based at least in part on a comparison between the electrical return signal expected to be returned by the non-faulty pipeline system and the electrical return signal that was actually returned by the pipeline system. For example, the online testing system and/or the online integrity testing process may determine that the online integrity state of the pipeline system is a non-faulty (e.g. non-defective) state when the actual electrical return signal does not deviate from the expected electrical return signal by more than an error threshold, which facilitates accounting for measurement (e.g., sensor) error. On the other hand, the online testing system and/or the online integrity testing process may determine that the integrity state of the pipeline system is a potentially faulty (e.g., defective) state when the actual electrical return signal deviates from the expected electrical return signal by more than the error threshold.

When the online integrity state of a pipeline system is a potentially faulty state, in some embodiments, an online testing system and/or an online integrity testing process may additionally determine one or more expected characteristics of a potential pipeline fault that resulted in the integrity state being identified as the potentially faulty state, for example, to facilitate locating and, thus, ameliorating (e.g., fixing) the potential pipeline fault. In some embodiments, the expected characteristics of a potential pipeline fault may include an expected location of the potential pipeline fault and/or an expected size of the pipeline fault. To facilitate determining expected characteristics of a potential pipeline fault, in some embodiments, the online testing system and/or the online integrity testing process may determine a travel speed that electrical signals are expected to travel along the pipeline system, for example, based at least in part on a model, empirical testing, external environmental conditions, fluid parameters of bore fluid in the pipeline system, implementation parameters, such as material and/or thickness, of pipe segment tubing deployed in the pipeline system, or any combination thereof.

In particular, in some embodiments, an online testing system and/or an online integrity testing process may determine the expected location of a potential pipeline fault in a pipeline system based at least in part on the expected travel speed of electrical signals in the pipeline system and a transmission-to-peak negative deviation duration, which occurs between a time at which negative deviation between an actual electrical return signal and an expected electrical return signal peaks and the transmission time of a corresponding electrical test signal. For example, when the expected travel speed of electrical signals in electrically conductive material implemented in pipe segment tubing matches the expected travel speed of electrical signals in an embedded return wire implemented in the pipe segment tubing and the length of the embedded return wire implemented in the pipe segment tubing matches the length of the pipe segment tubing, in some embodiments, the online testing system and/or the online integrity testing process may determine the total distance an electrical signal travels in the pipeline system before being returned and, thus, its contribution to the peak negative deviation in the actual electrical return signal. In such embodiments, the online testing system and/or the online integrity testing process may determine the distance the electrical signal traveled in electrically conductive material implemented in an intermediate layer of the pipe segment tubing before encountering the electrical impedance change resulting from the potential pipeline fault and, thus, the expected location of the pipeline fault in the pipeline system at least in part by dividing the total travel distance in half.

However, as described above, in some embodiments, an embedded return wire implemented in the tubing of a pipe segment deployed in a pipeline system may be helically shaped. In other words, in such embodiments, the length of an embedded return wire implemented in pipe segment tubing may differ from (e.g., be greater than) the length of the pipe segment tubing. Moreover, in some embodiments, the expected travel speed of electrical signals in electrically conductive material implemented in an intermediate layer of pipe segment tubing may differ from the expected travel speed of electrical signals in an embedded return wire that is implemented in the pipe segment tubing, for example, due at least in part to a difference in surface area between the electrically conductive material implemented in the intermediate layer of the pipe segment tubing and the embedded return wire implemented in the pipe segment tubing. Thus, to facilitate properly identifying an expected location of a potential pipeline fault, in such embodiments, an online testing system and/or an online integrity testing process may determine a helical distance domain-to-linear distance domain conversion factor, which may be applied to a length value of an embedded return wire to determine an equivalent length of pipe segment tubing and/or to the expected travel speed of electrical signals in the embedded return wire to determine an equivalent expected travel speed of electrical signals in the electrical conductive material implemented in the intermediate layer of the pipe segment tubing.

Additionally or alternatively, the expected travel speed of electrical signals in a pipeline system may facilitate determining an expected size of a potential pipeline fault in the pipeline system. In particular, in such embodiments, an online testing system and/or an online integrity testing process may determine the expected size of a potential pipeline fault based the expected travel of electrical signals and a negative deviation duration during which an actual electrical return signal negatively deviates from an expected electrical return signal, for example, at least in part by multiplying the negative deviation duration with the expected travel speed of the electrical signals. In this manner, as will be described in more detail below, the techniques described in the present disclosure may facilitate testing integrity of a pipeline system that includes a pipe segment with an embedded return wire, for example, during operation of the pipeline system, which, at least in some instances, may facilitate further improving operational efficiency and/or operational reliability of the pipeline system.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
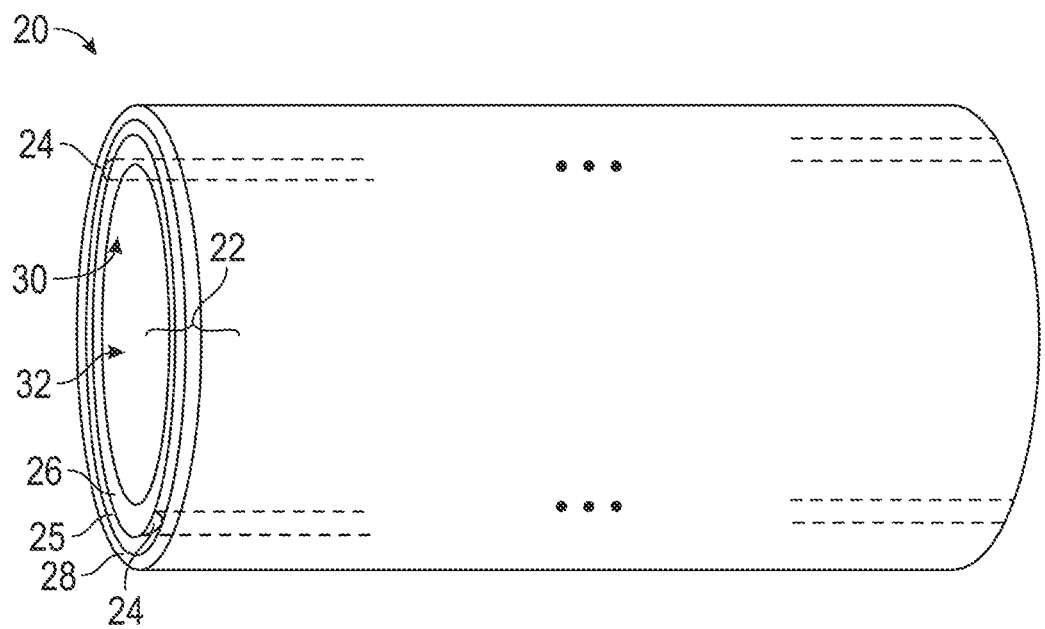
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in its annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate layer of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
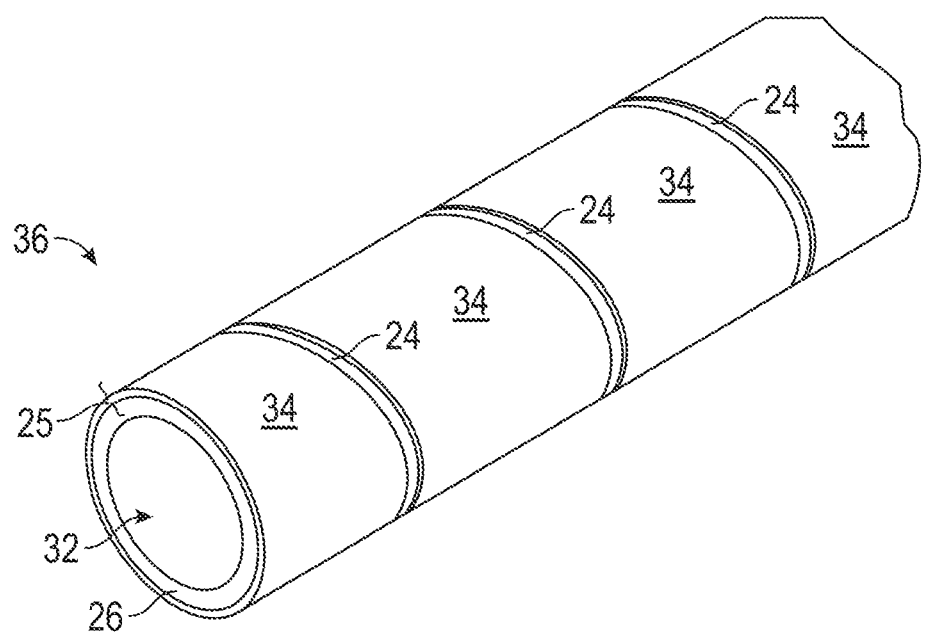
FIG. 3 is a perspective view of an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate layer 34 included in the annulus 25 of its pipe segment tubing 22, is shown in FIG. 3. In some embodiments, one or more intermediate layers 34 of the pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., test and/or return) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a metal (e.g., steel) strip around the inner layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34.

In any case, as described above, the tubing 22 of a pipe segment 20 may generally be implemented to facilitate isolating conditions within its pipe bore 32 from environmental conditions external to the pipe segment 20. However, even when implemented with multiple layers, in some instances, a fault (e.g., defect), such as a breach, a kink, and/or a dent, on pipe segment tubing 22 may compromise its integrity and, thus, its ability to provide isolation, for example, due to the defect resulting in excessive (e.g., undesired) fluid flow from the pipe segment directly out into environmental conditions external to the pipe segment 20 and/or from the external environmental conditions directly into the pipe segment 20. As such, at least in some instances, operating a pipeline system 10 while pipe segment tubing 22 deployed therein has an integrity compromising defect may affect (e.g., reduce) operational efficiency and/or operational reliability of the pipeline system 10, for example, due to the defect resulting in conveyed fluid being lost and/or contaminated by external environmental conditions. As such, to facilitate improving operational efficiency and/or operational reliability of a pipeline system 10, in some embodiments, the integrity of a pipe segment 20 deployed in or to be deployed in the pipeline system 10 may be tested by an offline testing system, for example, which is implemented and/or operated to perform an offline integrity testing process before beginning and/or resuming operation of the pipeline system 10.

Figure 4:
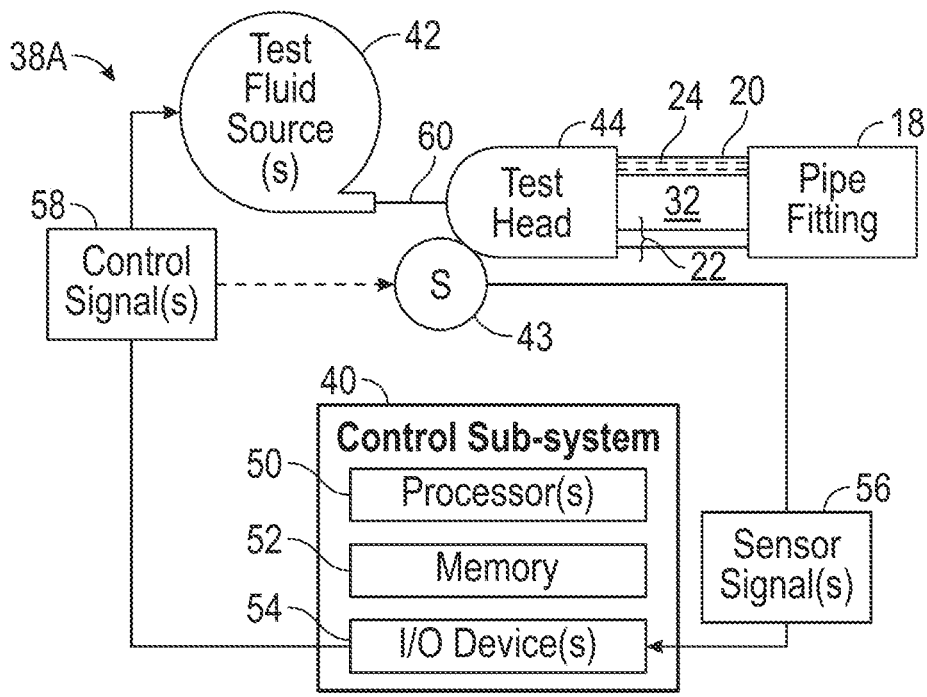
FIG. 4 is a block diagram of an example of an offline testing system that is implemented and/or operated to test offline integrity of pipe segment tubing, in accordance with an embodiment of the present disclosure.

To help illustrate, an example of an offline testing system 38A, which may be used to test integrity of a pipe segment 20 to be deployed in a pipeline system 10 offline, is shown in FIG. 4. As in the depicted example, an offline testing system 38A may include a control sub-system 40, one or more test fluid sources 42, one or more sensors 43, and at least one test head 44. In particular, as depicted, the test head 44 is coupled to an (e.g., first) end of the pipe segment 20 being tested.

However, it should be appreciated that the depicted example is merely intended to be illustrative and not limiting. In particular, although a single pipe segment 20 is depicted, in other embodiments, multiple pipe segments 20 may be concurrently tested, for example, by fluidly coupling the pipe segments 20 between the test head 44 and the depicted pipe fitting 18 via one or more midline pipe fittings 18. Additionally or alternatively, although a pipe fitting 18 is depicted as being coupled to another (e.g., second and/or opposite) end of the pipe segment 20 being tested, in other embodiments, another test head 44 may be used instead. In other words, in such embodiments, a first test head 44 may be coupled to a first end of a pipe segment 20 while a second test head 44 is coupled to a second (e.g., opposite) end of the pipe segment 20.

Additionally, in some embodiments, a test fluid source 42 in the offline testing system 38A may include a test fluid pump and/or a compressed air tank, which is implemented and/or operated to selectively supply (e.g., inject and/or pump) test fluid to the test head 44 via one or more test fluid conduits 60, for example, based at least in part on a control signal 58 received from the control sub-system 40 and/or valve position of one or more valves fluidly coupled between the test fluid source 42 and the test head 44. Although testing examples that utilize test fluid injection are described, in other embodiments, the techniques described in the present disclosure may additionally or alternatively be utilized in testing processes and/or testing systems 38 that are based on test fluid extraction. In other words, in such embodiments, the test fluid source 42 in the offline testing system 38A may include a test fluid pump, which is implemented and/or operated to selectively extract (e.g., vacuum and/or pump) test fluid out from the test head 44 via one or more test fluid conduits 60, for example, based at least in part on a control signal 58 received from the control sub-system 40 and/or valve position of one or more valves fluidly coupled between the test fluid source 42 and the test head 44.

Thus, at least in some embodiments, the control sub-system 40 may generally control operation of the offline testing system 38A. To facilitate controlling operation, as in the depicted example, a control sub-system 40 may include one or more processors 50, memory 52, and one or more input/output (I/O) devices 54. In some embodiments, the memory 52 in the control sub-system 40 may include a tangible, non-transitory, computer-readable medium that is implemented and/or operated to store data and/or executable instructions. For example, the memory 52 may store sensor data based at least in part on one or more sensor signals 56 received from a sensor 43. As such, in some embodiments, the memory 52 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 50 in the control sub-system 40 may include processing circuitry that is implemented and/or operated to process data and/or execute instructions stored in memory 52. In other words, in some such embodiments, a processor 50 in the control sub-system 40 may include one or more general purpose microprocessors, one or more application specific integrated circuits (ASICs), one or more field programmable gate arrays (FPGAs), or any combination thereof. For example, a processor 50 in the control sub-system 40 may process sensor data stored in memory 52 to determine an integrity state of pipe segment tubing 22 being tested.

Additionally or alternatively, a processor 50 in the control sub-system 40 may execute instructions stored in memory 52 to determine one or more control (e.g., command) signals 58 that instruct the offline testing system 38A to perform corresponding control actions. For example, the control sub-system 40 may determine a control signal 58 that instructs a test fluid source 42 to supply (e.g., inject and/or pump) test fluid to the test head 44. As another example, the control sub-system 40 may determine a control signal 58 that instructs a sensor 43 to return one or more sensor signals 56 indicative of corresponding fluid parameters, such as fluid temperature, fluid pressure, and/or fluid composition, determined (e.g., sensed and/or measured) by the sensor 43.

To enable communication outside of the control sub-system 40, in some embodiments, the I/O devices 54 of the control sub-system 40 may include one or more input/output (I/O) ports (e.g., terminals). Additionally, to facilitate communicating the results of an offline integrity test to a user (e.g., operator), in some embodiments, the I/O devices 54 of the control sub-system 40 may include one or more user output devices, such as an electronic display, which is implemented and/or operated to display a graphical user interface (GUI) that provides a visual representation of offline integrity test results (e.g., offline integrity state of tested pipe segment 20). Furthermore, to enable user interaction with the offline testing system 38A, in some embodiments, the I/O devices 54 of the control sub-system 40 may include one or more user input devices, such as a hard button, a soft button, a keyboard, a mouse, and/or the like. For example, the one or more user input devices may enable a user (e.g., operator), such as service technician, to input a user command that instructs the offline testing system 38A to initiate an offline integrity test on a pipe segment 20.

In any case, as described above, the tubing 22 of a pipe segment 20 is generally implemented to facilitate isolating (e.g., insulating) conditions internal to the pipe segment 20 from environmental conditions external to the pipe segment 20. For example, an outer layer 28 of the pipe segment tubing 22 may be implemented to facilitate isolating the external environmental conditions from conditions in the pipe bore 32 of the pipe segment 20 and, thus, from conditions in a fluid conduit 24 that is implemented in the tubing annulus 25, which is internal to the outer layer 28 of the pipe segment tubing 22. Additionally or alternatively, an inner layer 26 of the pipe segment tubing 22 may be implemented to facilitate isolating the conditions in the pipe bore 32 of the pipe segment 20 from the external environmental condition and, thus, from the conditions in a fluid conduit 24 that is implemented in the tubing annulus 25, which is external to the inner layer 26 of the pipe segment tubing 22.

Nevertheless, in some instances, a fault (e.g., defect), such as a dent, a kink, and/or a breach, on the tubing 22 of a pipe segment 20 may affect (e.g., compromise and/or reduce) its integrity and, thus, its ability to provide isolation. For example, a fault in the outer layer 28 of the pipe segment tubing 22 may reduce its ability to provide isolation between environmental conditions external to the pipe segment 20 and the conditions in a fluid conduit 24 that is implemented in the tubing annulus 25, which is internal to the outer layer 28 of the pipe segment tubing 22. Additionally or alternatively, a fault in an inner layer 26 of the pipe segment tubing 22 may reduce its ability to provide isolation between the conditions in the pipe bore 32 of the pipe segment 20 and the conditions in a fluid conduit 24 that is implemented in the tubing annulus 25, which is external to the inner layer 26 of the pipe segment tubing 22.

Generally, when a fault is not present on its tubing 22, one or more parameters (e.g., characteristics and/or properties) of fluid flowing through a pipe segment 20 may nevertheless change as it flows therethrough. However, a fluid parameter change resulting from fluid flow through a pipe segment 20 with non-faulty (e.g., non-defective) tubing 22 is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof. In other words, at least in some instances, an unexpected (e.g., unpredicted) change in a fluid parameter resulting from fluid flow through a pipe segment 20 may be indicative of corresponding pipe segment tubing 22 potentially having one or more faults, such as a dent, a kink, and/or a breach.

Leveraging this fact, to facilitate testing pipe segment integrity offline, in some embodiments, the offline testing system 38A may inject a test fluid into one or more fluid conduits 24 implemented in the tubing annulus 25 (e.g., one or more intermediate layers 34) of the pipe segment tubing 22, for example, via a test fluid source 42 fluidly coupled to the test head 44. In particular, in some embodiments, the test fluid may be an inert fluid, such as nitrogen (e.g., $N_2$) gas, for example, to facilitate reducing the likelihood that the test fluid itself affects (e.g., reduces) integrity of pipe segment tubing 22. Additionally, in some embodiments, one or more fluid parameters (e.g., temperature, pressure, and/or composition) of the test fluid may be pre-determined before supply to a fluid conduit 24 implemented in an intermediate layer of the pipe segment tubing 22, for example, offline by a test lab and/or a fluid supplier such that the pre-determined fluid parameters of the test fluid are stored in memory 52 of the control sub-system 40. In some embodiments, one or more fluid parameters of the test fluid may be additionally or alternatively determined (e.g., sensed and/or measured) while the test fluid is being supplied to the tubing annulus 25 of the pipe segment tubing 22, for example, online and/or in real-time via one or more sensors 43 such that the input (e.g., initial) fluid parameters of the test fluid are stored in memory 52 of the control sub-system 40.

As described above, at least in some instances, a fault in the tubing 22 of a pipe segment 20 may result in one or more parameters of fluid flowing through the pipe segment 20 changing in a manner different than expected (e.g., predicted). To facilitate determining changes in fluid parameters resulting from fluid flow in the annulus 25 of pipe segment tubing 22, in some embodiments, the offline testing system 38A may determine one or more downstream fluid parameters (e.g., temperature, pressure, and/or composition) via one or more sensors 43, for example, which are internal to the test head 44 and/or fluidly coupled to the test head 44. In other words, in such embodiments, the offline testing system 38A may test the integrity of pipe segment tubing 22 at least in part by comparing one or more fluid parameters of fluid (e.g., test fluid) supplied to the tubing annulus 25 and corresponding downstream fluid parameters resulting from fluid flow through the tubing annulus 25. Thus, at least in some instances, implementing and/or operating an offline testing system 38A in this manner may facilitate improving operational reliability of a pipeline system 10, for example, by enabling confirmation of pipe segment integrity and/or amelioration of a pipe segment fault before beginning and/or resuming operation of the pipeline system 10.

Figure 5:
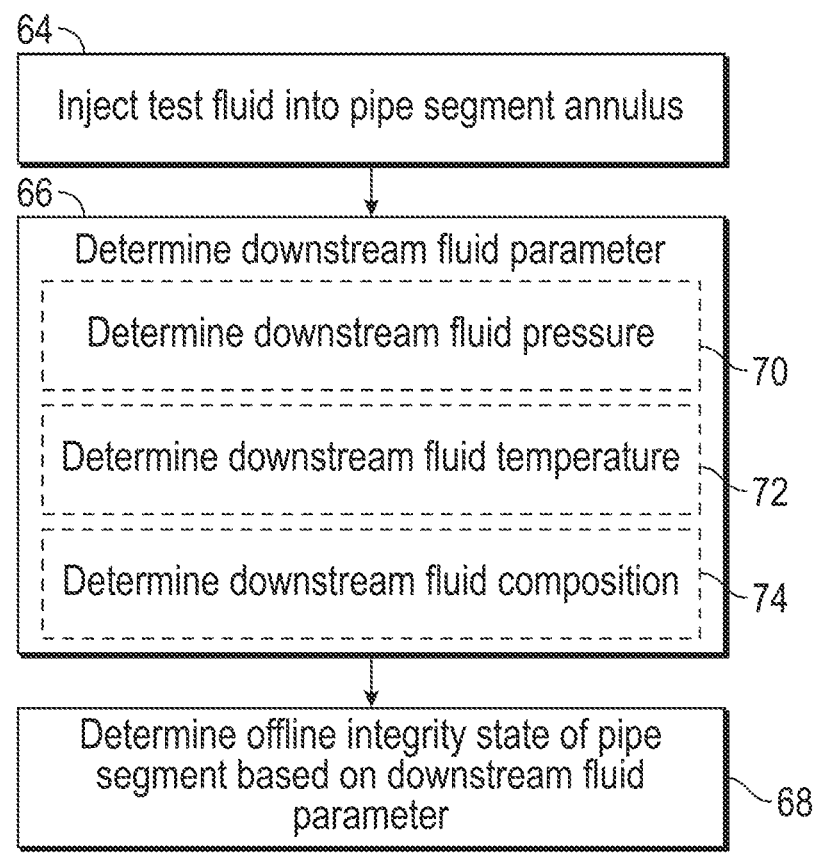
FIG. 5 is a flow diagram of an example process for performing an offline integrity testing process, in accordance with an embodiment of the present disclosure.

To help further illustrate, an example of a process 62 for testing pipe segment integrity offline is described in FIG. 5. Generally, the process 62 includes injecting test fluid into a pipe segment annulus (process block 64). Additionally, the process 62 generally includes determining a downstream fluid parameter (process block 66) and determining an offline integrity state of the pipe segment based on the downstream fluid parameter (process block 68).

Although described in a specific order, which corresponds with an embodiment of the present disclosure, it should be appreciated that the example process 62 is merely intended to be illustrative and non-limiting. In particular, in other embodiments, a process 62 for testing pipe segment integrity offline may include one or more additional process blocks and/or omit one or more of the depicted process blocks. Moreover, in some embodiments, the process 62 may be performed at least in part by executing instructions stored in a tangible, non-transitory, computer-readable medium, such as memory 52 in a control sub-system 40, using processing circuitry, such as a processor 50 in the control sub-system 40.

For example, in some such embodiments, a control sub-system 40 in an offline testing system 38A may instruct the offline testing system 38A to inject test fluid (e.g., gas and/or liquid) into the tubing annulus 25 of a pipe segment 20 that is secured to a test head 44 in the offline testing system 38A (process block 64). As described above, in some embodiments, one or more fluid conduits 24 may be implemented in the annulus 25 (e.g., one or more intermediate layers 34) of pipe segment tubing 22. Thus, to inject test fluid into the tubing annulus 25, in such embodiments, the control sub-system 40 may selectively instruct a test fluid source 42 to supply (e.g., pump and/or flow) the test fluid to the test head 44 secured to the pipe segment 20, for example, via one or more control signals 58. In other embodiments, a user (e.g., operator), such as a service technician, may manually control injection of the test fluid, for example, by selectively turning on a test fluid source 42 and/or adjusting valve position of a value that is fluidly coupled between the test fluid source 42 and the test head 44.

Moreover, in some embodiments, the test fluid may be an inert fluid, such as nitrogen (e.g., $N_2$) gas, for example, to facilitate reducing the likelihood that the test fluid itself affects (e.g., reduces) integrity of pipe segment tubing 22. In any case, as will be described in more detail below, in some embodiments, an offline integrity state of pipe segment tubing 22 may be determined based at least in part on one or more fluid parameters, such as temperature, pressure, and/or composition, of the test fluid. In some such embodiments, one or more fluid parameters of the test fluid may be pre-determined, for example, offline by a test lab and/or a fluid supplier and stored in memory 52 of the offline testing system 38A. Additionally or alternatively, one or more fluid parameters of the test fluid may be determined while the test fluid is being supplied to a fluid conduit 24 implemented in an intermediate layer 34 of the pipe segment tubing 22, for example, online and/or in real-time via one or more sensors 43.

Furthermore, the offline testing system 38A may determine one or more downstream fluid parameters that result from injection of the test fluid into one or more fluid conduits 24 implemented in the annulus 25 (e.g., one or more intermediate layers 34) of the pipe segment tubing 22 (process block 66). As described above, in some embodiments, the one or more downstream fluid parameters may include a downstream fluid pressure determined (e.g., measured and/or sensed) by a pressure sensor 43, a downstream fluid temperature determined by a temperature sensor 43, and/or a downstream fluid composition determined by a fluid composition sensor 43. Thus, in such embodiments, determining the one or more downstream fluid parameters may include determining a downstream fluid pressure (process block 70), determining a downstream fluid temperature (process block 72), determining a downstream fluid composition (process block 74), or any combination thereof, for example, based at least in part on corresponding sensor signals 56 received from one or more sensors 43.

The offline testing system 38A may then determine an offline integrity state of the pipe segment tubing 22 based at least in part on the one or more downstream fluid parameters (process block 68). As described above, the tubing 22 of a pipe segment 20 is generally implemented to facilitate isolating (e.g., insulating) conditions internal to the pipe segment 20 from environmental conditions external to the pipe segment 20. Generally, when a fault is not present on its tubing 22, one or more parameters (e.g., characteristics and/or properties) of fluid flowing through a pipe segment 20 may nevertheless change as it flows therethrough. However, a fluid parameter change resulting from fluid flow through a pipe segment 20 with a non-faulty (e.g., non-defective) pipe segment tubing 22 is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof.

In other words, at least in some instances, an actual fluid parameter change that differs (e.g., deviates) from a corresponding expected (e.g., predicted) fluid parameter change may be indicative of a potential pipeline fault being present on pipe segment tubing 22. For example, an actual fluid pressure change (e.g., drop) that differs from an expected fluid pressure change may be indicative of fluid leaking from a fluid conduit 24 implemented in an intermediate layer 34 of the pipe segment tubing 22 and, thus, that the pipe segment tubing 22 is potentially faulty (e.g., defective). Additionally, an actual fluid temperature change (e.g., increase or decrease) that differs from an expected fluid temperature change may be indicative increased heat transfer between a fluid conduit 24 implemented in an intermediate layer 34 of the pipe segment tubing 22 and conditions external to the pipe segment tubing 22 and, thus, that the pipe segment tubing is potentially faulty and/or that the external (e.g., environmental and/or bore) conditions will potentially shorten the lifespan of the pipe segment tubing 22. Furthermore, an actual fluid composition change that differs from an expected fluid composition change may be indicative of conditions external to the pipe segment tubing 22 contaminating the conditions in a fluid conduit 24 implemented in an intermediate layer 34 of the pipe segment tubing 22 and, thus, that the pipe segment tubing 22 is potentially faulty.

To determine an actual fluid parameter change, the offline testing system 38A may compare a downstream fluid parameter with a corresponding fluid parameter of the test fluid. For example, the offline testing system 38A may determine an actual fluid pressure change at least in part by comparing the downstream fluid pressure with the fluid pressure of the test fluid. Additionally, the offline testing system 38A may determine an actual fluid temperature change at least in part by comparing the downstream fluid temperature with the fluid temperature of the test fluid. Furthermore, the offline testing system 38A may determine an actual fluid temperature change at least in part by comparing the downstream fluid temperature with the fluid temperature of the test fluid.

In some embodiments, the offline testing system 38A may determine that the offline integrity state of the pipe segment tubing 22 is a non-faulty (e.g., non-defective) state when each of the actual fluid parameter changes does not differ from a corresponding expected fluid parameter change by more than an error threshold, for example, which accounts for measurement (e.g., sensor) error. On the other hand, the offline testing system 38A may determine that the offline integrity state of the pipe segment tubing 22 is a potentially faulty (e.g., defective) state when one or more of the actual fluid parameter changes differs from a corresponding expected (e.g., predicted) fluid parameter change, for example, by more than a corresponding error threshold. In this manner, an offline testing system 38A may be operated to determine an offline integrity state for a pipe segment deployed or to be deployed in a pipeline system 10, for example, before beginning and/or resuming operation of the pipeline system 10.

However, at least in some instances, a pipeline fault may develop on a pipe segment 20 deployed in a pipeline system 10 during operation of the pipeline system 10, for example, due to environmental conditions and/or inadvertent contact with the tubing of the pipe segment. In other words, in such instances, the pipeline fault may not be present in the pipeline system 10 when an offline integrity test was previously performed on the pipe segment 20. However, operating a pipeline system 10 while a subsequently developed pipeline fault is present therein may nevertheless affect (e.g., reduce) operational efficiency and/or operational reliability of the pipeline system, for example, due to the pipeline fault resulting in conveyed fluid being lost and/or contaminated by external environmental conditions. Accordingly, to facilitate further improving pipeline operational efficiency and/or pipeline operational reliability, the present disclosure provides techniques for implementing and/or operating an online testing system 38 to perform an online integrity testing process of a pipeline system 10, for example, periodically or continuously during operation of the pipeline system 10.

Figure 6:
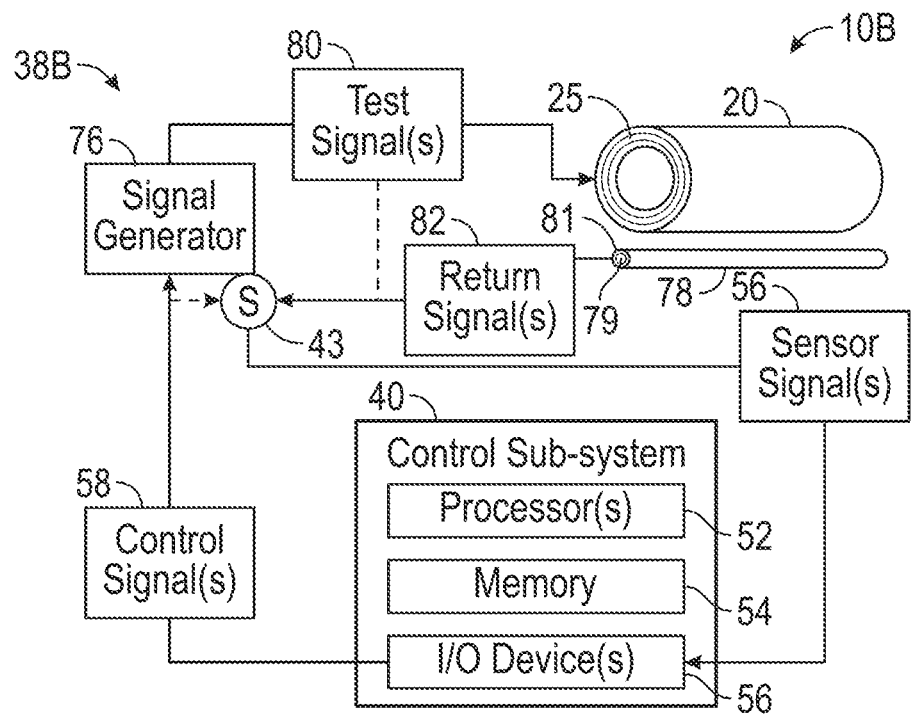
FIG. 6 is block diagram of an example of an online testing system that is electrically coupled to tubing of a pipe segment and to a return wire, in accordance with an embodiment of the present disclosure.

To help illustrate, an example of an online testing system 38B, which may be used to test integrity of a pipeline system 10B online (e.g., during operation of the pipeline system 10B), is shown in FIG. 6. As depicted, the pipeline system 10B includes a pipe segment 20, for example, in addition to one or more other pipe segments 20 and/or one or more pipe fittings 18. Additionally, as in the depicted example, an online testing system 38B may include a control sub-system 40, one or more sensors 43, a signal generator 76, and one or more return wires (e.g., cables) 78, which have a conductive layer 79 and insulating layer 81 implemented (e.g., disposed) around the conductive layer 79.

In fact, in some embodiments, the online testing system 38B of FIG. 6 may be integrated with the offline testing system 38A of FIG. 4. Thus, in such embodiments, the control sub-system 40 of FIG. 6 may generally match the control sub-system 40 of FIG. 4. In other embodiments, the online testing system 38B of FIG. 6 may be implemented separately from the offline testing system 38A of FIG. 4.

In any case, in some embodiments, the control sub-system 40 may generally control operation of the online testing system 38B. To facilitate controlling operation, as in the depicted example, the control sub-system 40 may include one or more processors 50, memory 52, and one or more input/output (I/O) devices 54. In some embodiments, the memory 52 in the control sub-system 40 may include a tangible, non-transitory, computer-readable medium that is implemented and/or operated to store data and/or executable instructions. For example, the memory 52 may store sensor data based at least in part on one or more sensor signals 56 received from a sensor 43. As such, in some embodiments, the memory 52 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 50 in the control sub-system 40 may include processing circuitry that is implemented and/or operated to process data and/or execute instructions stored in memory 52. In other words, in some such embodiments, a processor 50 in the control sub-system 40 may include one or more general purpose microprocessors, one or more application specific integrated circuits (ASICs), one or more field programmable gate arrays (FPGAs), or any combination thereof. For example, a processor 50 in the control sub-system 40 may process sensor data stored in memory 52 to determine an online integrity state of the pipeline system 10B being tested.

Additionally or alternatively, a processor 50 in the control sub-system 40 may execute instructions stored in memory 52 to determine one or more control (e.g., command) signals 58 that instruct the online testing system 38B to perform corresponding control actions. For example, the control sub-system 40 may determine a control signal 58 that instructs the signal generator 76 to supply one or more electrical test signals 80 to electrically conductive material implemented in the tubing annulus 25 of the pipe segment 20. As another example, the control sub-system 40 may determine a control signal 58 that instructs a sensor 43 to return one or more sensor signals 56 indicative of corresponding electrical return signals 82 received from the return wire 78.

To enable communication outside of the control sub-system 40, in some embodiments, the I/O devices 54 of the control sub-system 40 may include one or more input/output (I/O) ports (e.g., terminals). Additionally, to facilitate communicating the results of an online integrity test to a user (e.g., operator), in some embodiments, the I/O devices 54 of the control sub-system 40 may include one or more user output devices, such as an electronic display, which is implemented and/or operated to display a graphical user interface (GUI) that provides a visual representation of online integrity test results (e.g., online integrity state of tested pipeline system 10B). Furthermore, to enable user interaction with the online testing system 38B, in some embodiments, the I/O devices 54 of the control sub-system 40 may include one or more user input devices, such as a hard button, a soft button, a keyboard, a mouse, and/or the like. For example, the one or more user input devices may enable a user (e.g., operator), such as service technician, to input a user command that instructs the online testing system 38B to initiate an online integrity test for the pipeline system 10B.

In any case, as described above, the tubing 22 of a non-faulty pipe segment 20 generally exhibits a relatively constant electrical impedance (e.g., resistance, capacitance, and/or inductance). Additionally, as described above, a pipeline fault in the tubing 22 of a pipe segment 20 generally results in an electrical impendence at the pipeline fault that differs from the relatively constant electrical impendence of a non-faulty portion of the pipe segment tubing 22. Thus, as will be described in more detail below, the online testing system 38B may determine an online integrity state of a pipeline system 10B based at least in part on an electrical return signal 82 received from a return wire 78 in response to the supply of an electrical test signal 80 to electrically conductive material implemented in the tubing annulus 25 (e.g. one or more intermediate layer 34) of a pipe segment 20 deployed in the pipeline system 10B, for example, at least in part by analyzing the profile of the electrical return signal 82 over time and/or comparing the electrical return signal 82 that was actually returned against an electrical return signal 82 that is expected to be returned when the pipeline system 10B is not faulty.

However, it should be appreciated that the depicted example is merely intended to be illustrative and not limiting. In particular, in some embodiments, a return wire 78 may be embedded (e.g., integrated) within the tubing 22 of a pipe segment 20 deployed in a pipeline system 10, which, at least in some instances, may facilitate improving testing efficiency, for example, at least in part by obviating separate deployment of a discrete return wire 78 proximate and, thus, external to the pipe segment 20. Merely as an illustrative non-limiting example, in some such embodiments, an embedded return wire 78 may be implemented within a fluid conduit 24 that is defined in an intermediate layer 34 of the tubing 22 of a pipe segment 20, which is included in the tubing annulus 25 of the pipe segment 20.

Figure 7:
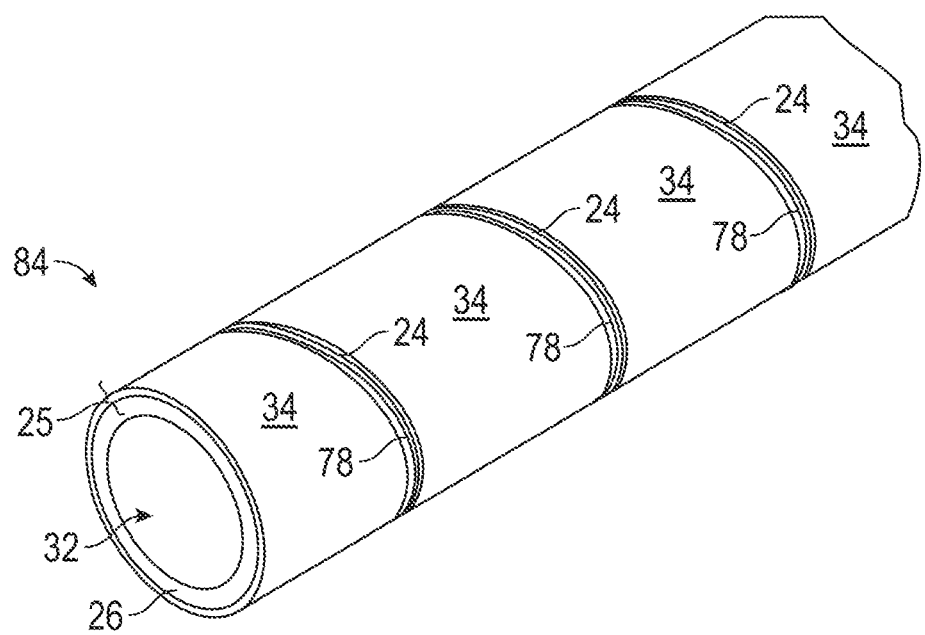
FIG. 7 is a perspective view of an example of a portion the pipe segment of FIG. 4 with an embedded (e.g., integrated) return wire implemented within its tubing annulus, in accordance with an embodiment of the present disclosure.

To help illustrate, an example of a portion 84 of a pipe segment 20, which includes an embedded return wire 78, is shown in FIG. 7. As depicted, the portion 84 of the pipe segment 20 additionally includes an inner layer 26 and an intermediate layer 34, which is included in the tubing annulus 25 of the pipe segment 20. In some embodiments, the tubing inner layer 26 of FIG. 7 may generally match the tubing inner layer 26 of FIG. 3 and/or the tubing intermediate layer 34 may generally match the tubing intermediate layer 26 of FIG. 3.

However, as depicted in FIG. 7, the embedded return wire 78 is implemented within a fluid conduit 24 that is defined in the intermediate layer 34, for example, instead of leaving the fluid conduit 24 completely open. In other words, as will be described in more detail below, in some embodiments, a return wire 78 may be embedded (e.g., integrated) within the tubing 22 of a pipe segment 20 at least in part by wrapping (e.g., winding) the return wire 78 on a (e.g., inner) layer of the pipe segment tubing 22, for example, such that the embedded return wire 78 resides within gaps left in a co-planar intermediate layer 34. In any case, as in the depicted example, in some embodiments, an embedded return wire 78 implemented within the tubing 22 of a pipe segment 20 may be helically shaped, for example, due to the fluid conduit 24 in which it is implemented being helically shaped.

Nevertheless, it should be appreciated that the depicted example is merely intended to be illustrative and not limiting. In particular, in other embodiments, an embedded return wire 78 implemented within the tubing 22 of a pipe segment 20 may have a different shape. For example, the embedded return wire 78 may have a non-helical (e.g., linear and/or straight) shape when implemented within a non-helically shaped fluid conduit 24. In any case, at least in some instances, implementing a pipe segment 20 with an embedded return wire 78 may facilitate improving testing efficiency, for example, at least in part by obviating separate deployment of a discrete return wire 78 proximate and, thus, external to the pipe segment 20.

Figure 8:
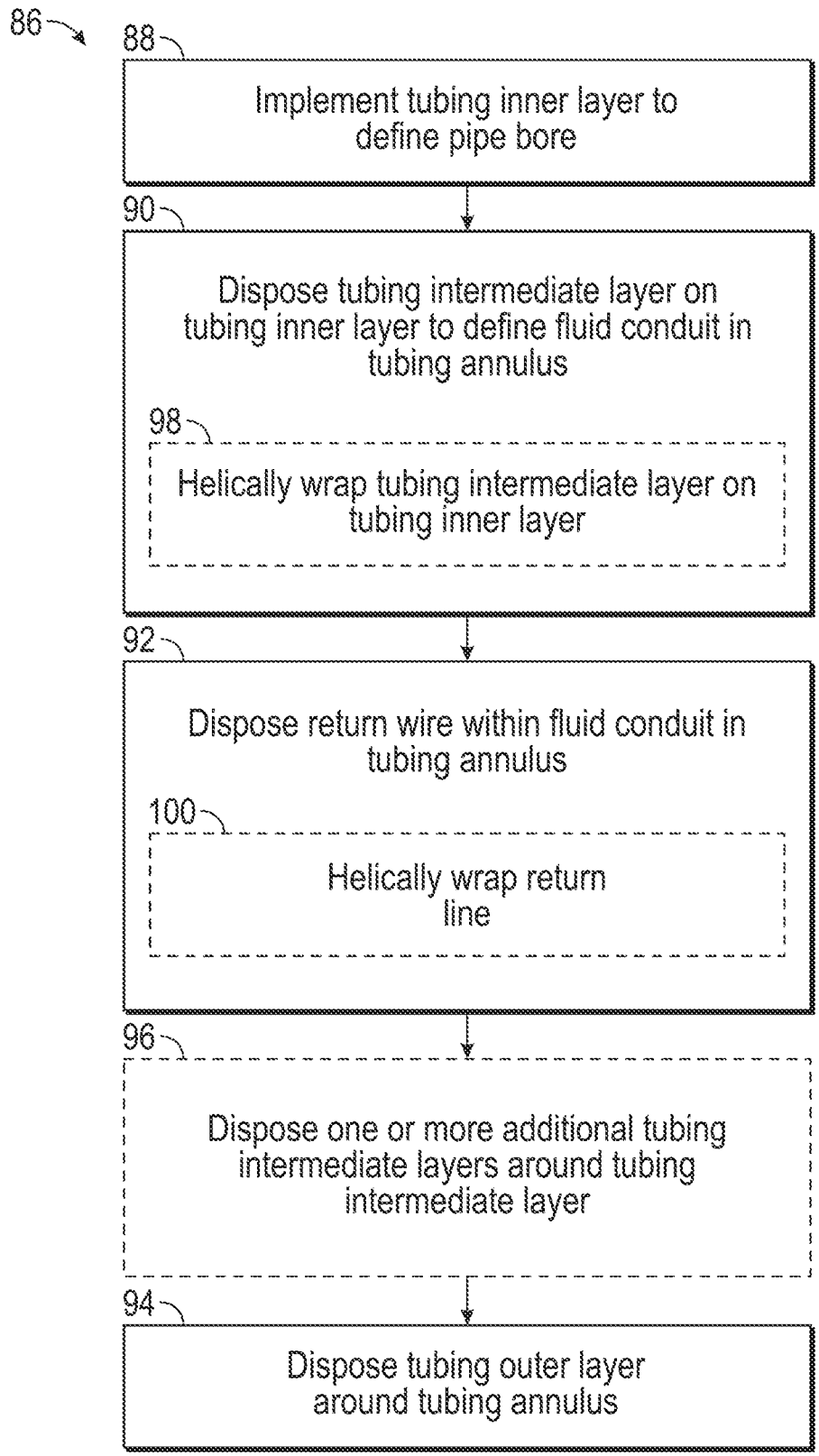
FIG. 8 is a flow diagram of an example process for implementing a pipe segment with an embedded return wire, in accordance with an embodiment of the present disclosure.

To help further illustrate, an example of a process 86 for implementing a pipe segment 20 with an embedded return wire 78 is described in FIG. 8. Generally, the process 86 includes implementing a tubing inner layer to define a pipe bore (process block 88) and disposing a tubing intermediate layer on the tubing inner layer to define a fluid conduit in a tubing annulus (process block 90). Additionally, the process 86 includes disposing a return wire within the fluid conduit in the tubing annulus (process block 92) and disposing a tubing outer layer over the tubing annulus (process block 94).

Although described in a specific order, which corresponds with an embodiment of the present disclosure, it should be appreciated that the example process 86 is merely intended to be illustrative and not limiting. In particular, in other embodiments, a process 86 for implementing a pipe segment 20 with an embedded return wire 78 may include one or more additional process blocks and/or omit one or more of the depicted process blocks. For example, some embodiments of the process 86 may additionally include disposing one or more additional tubing intermediate layers 34 on the tubing intermediate layer 34 (process block 96) while other embodiments of the process 86 do not. Additionally or alternatively, in other embodiments, one or more of the depicted process blocks may be performed in a different order, for example, such that return wire 78 is disposed before the tubing intermediate layer 34.

In any case, as described above, the tubing 22 of a pipe segment 20 may include an inner (e.g., innermost) layer 26, which is implemented to define (e.g., enclose) a pipe bore 32 through the pipe segment 20. As such, implementing the pipe segment 20 may include implementing an inner layer 26 of its tubing 22 to define a pipe bore 32 (process block 88). In particular, as described above, in some embodiments, the inner layer 26 of the pipe segment tubing 22 may be implemented using composite material and/or plastic, such as high-density polyethylene (HDPE) and/or raised temperature polyethylene (PE-RT).

Additionally, as described above, the tubing 22 of a pipe segment 20 may include one or more intermediate layers 34 implemented around its inner layer 26. In particular, as described above, each intermediate layer 34 in the pipe segment tubing 22 may be implemented to define one or more fluid conduits 26 and, thus, included in the tubing annulus 25 of the pipe segment tubing 22. As such, implementing the pipe segment 20 may include disposing an intermediate layer 34 of the pipe segment tubing 22 on the inner layer 26 of the pipe segment tubing 22 to define one or more fluid 26 in its tubing annulus 25 (process block 90). In particular, as described above, in some embodiments, the intermediate layer 34 of the pipe segment tubing 22 may be implemented using composite material and/or metal, such as carbon steel, stainless steel, duplex stainless steel, super duplex stainless steel, or any combination thereof.

Furthermore, as described above, in some embodiments, an intermediate layer 34 of pipe segment tubing 22 may be implemented to enable the intermediate layer 34 to be helically wrapped (e.g., wound) in the pipe segment tubing 22. In other words, in such embodiments, implementing the pipe segment 20 may include helically wrapping the intermediate layer 34 of the pipe segment tubing 22 on the inner layer 26 of the pipe segment tubing 22 (process block 98). In this manner, as described above, one or more helically shaped fluid conduits 26 may be implemented within the tubing annulus 25 of the pipe segment 20.

Moreover, as described above, a return wire 78, which is to be embedded (e.g., integrated) within the tubing 22 of a pipe segment 20, may be implemented to be disposed within a fluid conduit 24 defined in a tubing annulus 25 of the pipe segment 20. As such, implementing the pipe segment 20 may include disposing the embedded return wire 78 within a fluid conduit 24 defined in an intermediate layer 34 that is included in the tubing annulus 25 of the pipe segment 20 (process block 92). Additionally, as described above, in some embodiments, the intermediate layer 34 may be helically wrapped on the inner layer 26 of the pipe segment tubing 22 to define a helically shaped fluid conduit 24. In other words, in such embodiments, disposing the embedded return wire 78 within the fluid conduit 24 in the tubing annulus 25 may include helically wrapping the embedded return wire 78, for example, on the inner layer 26 of the pipe segment tubing 22 and/or another intermediate layer 34 of the pipe segment tubing 22 (process block 100).

Furthermore, as described above, the tubing 22 of a pipe segment 20 may include an outer (e.g., outermost) layer 28, which is implemented to be disposed around the tubing annulus 25 of the pipe segment 20. Thus, implementing the pipe segment 20 may include disposing the outer layer 28 of pipe segment tubing 22 around the tubing annulus 25 of the pipe segment tubing 22 (process block 94). In other words, in some embodiments, the outer layer 28 of the pipe segment tubing 22 may be disposed directly over the intermediate layer 34 that is co-planar with the embedded return wire 78. Additionally, as described above, in some embodiments, the outer layer 28 of the pipe segment tubing 22 may be implemented using composite material and/or plastic, such as high-density polyethylene (HDPE) and/or raised temperature polyethylene (PE-RT).

However, as described above, in other embodiments, the tubing annulus 25 of a pipe segment 20 may be implemented with multiple intermediate layers 34. In other words, in such embodiments, implementing the pipe segment 20 may include disposing one or more additional intermediate layers 34 around the intermediate layer 34 that is co-planar with the embedded return wire 78 before the outer layer 28 is disposed around the tubing annulus 25 (process block 96). As described above, in some such embodiments, the one or more additional intermediate layers 34 may each also be helically wrapped to define helically shaped fluid conduits 26 in the tubing annulus 25 of the pipe segment 20. In fact, in some embodiments, an embedded return wire 78 may additionally or alternatively be disposed within a fluid conduit 24 that is defined by an additional (e.g., outer) intermediate layer 34 included in the tubing annulus 25 of the pipe segment 20. In any case, at least in some instances, implementing a pipe segment 20 with an embedded return wire 78 in this manner may facilitate improving efficiency of online integrity testing, for example, at least in part by obviating separate deployment of a discrete return wire 78 proximate and, thus, external to the pipe segment 20.

Figure 9:
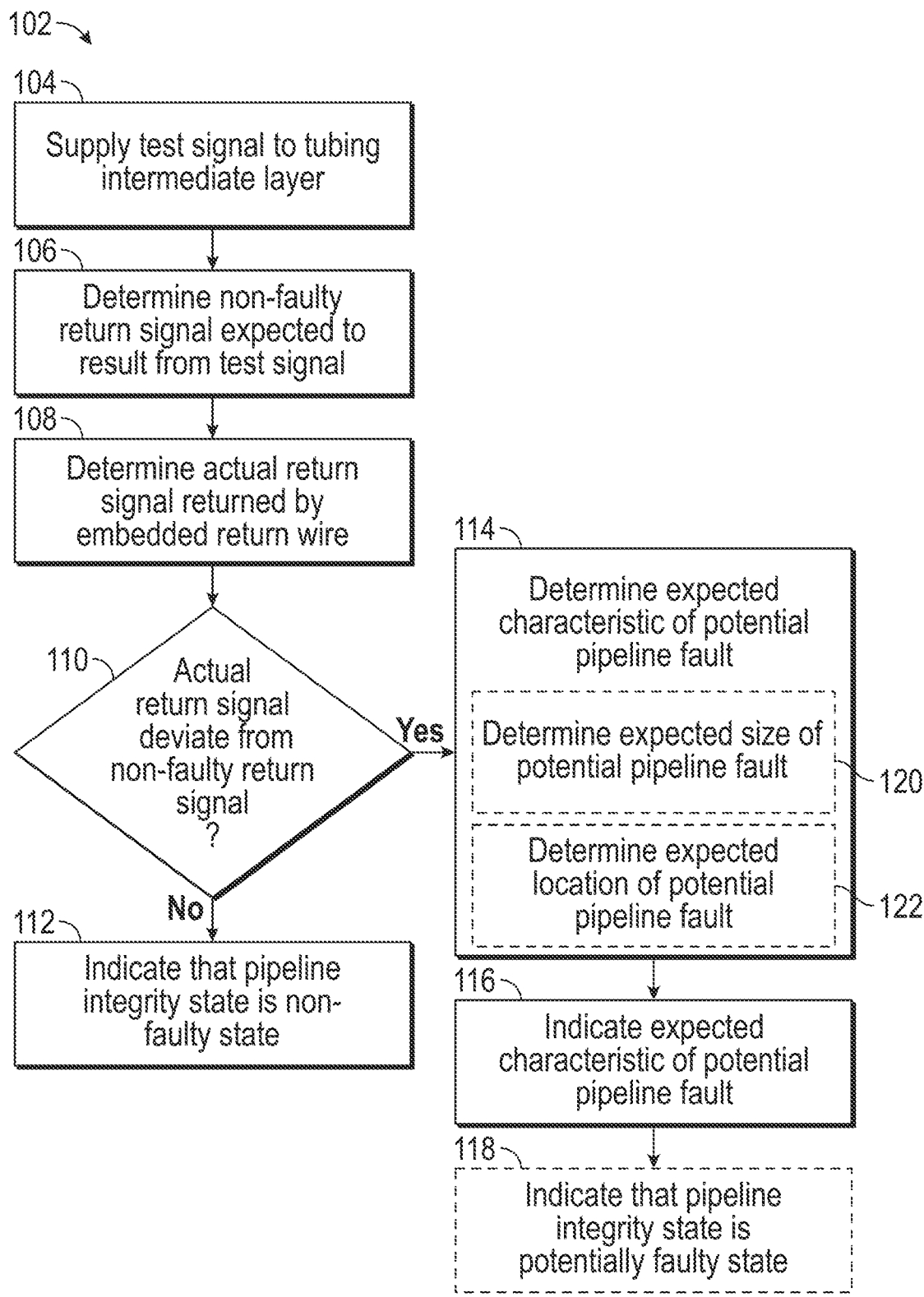
FIG. 9 is a flow diagram of an example process for performing an online integrity testing process on a pipeline system that includes a pipe segment with an embedded return wire, in accordance with an embodiment of the present disclosure.

An example of a process 102 for testing integrity of a pipeline system 10 online is described in FIG. 9. Generally, the process 102 includes supplying a test signal to a tubing intermediate layer (process block 104), determining a non-faulty return signal expected to result from the test signal (process block 106), determining an actual return signal returned by an embedded return wire (process block 108), determining whether the actual return signal deviates the non-faulty return signal (decision block 110), and indicating that pipeline integrity state is a non-faulty state when the actual return signal does not deviate from the non-faulty return signal (process block 112). Additionally, when the actual return signal deviates from the non-faulty return signal, the process 102 generally includes determining an expected characteristic of a potential pipeline fault (process block 114) and indicating the expected characteristic of the potential pipeline fault (process block 116).

Although described in a specific order, which corresponds with an embodiment of the present disclosure, it should be appreciated that the example process 102 is merely intended to be illustrative and not limiting. In particular, in other embodiments, a process 102 for testing integrity of a pipeline system 10 online may include one or more additional process blocks and/or omit one or more of the depicted process blocks. For example, some embodiments of the process 102 may additionally include explicitly indicating that the pipeline integrity state is a potentially faulty state when the actual electrical return signal 82 does not match the expected non-faulty electrical return signal 82 (process block 118) while other embodiments of the process 102 do not. Additionally or alternatively, in other embodiments, one or more of the depicted process blocks may be performed in a different order, for example, such that actual electrical return signal 82 is determined before the expected non-faulty electrical return signal 82. Moreover, in some embodiments, the process 102 may be performed at least in part by executing instructions stored in a tangible, non-transitory, computer-readable medium, such as memory 52 in a control sub-system 40, using processing circuitry, such as a processor 50 in the control sub-system 40.

For example, to facilitate testing integrity of a pipeline system 10, in some such embodiments, a control sub-system 40 in an online testing system 38B may instruct a signal generator 76 to supply an electrical test signal 80 to electrically conductive material, such as metal, implemented in an intermediate layer 34 of the tubing 22 of a pipe segment 20 deployed in the pipeline system 10 (process block 104). In other embodiments, a user (e.g., operator), such as a service technician, may manually operate the signal generator 76 to supply the electrical test signal 80 to the electrically conductive material implemented in the intermediate layer 34 of the pipe segment tubing 22, for example, at least in part by selectively turning on the signal generator 76. In any case, in some embodiments, the electrical test signal 80 may be an alternating current (AC) electrical signal while, in other embodiments, the electrical test signal 80 may be direct current (DC) electrical signal.

Additionally, the online testing system 38B may determine an electrical return signal 82 that is expected to result when the electrical test signal 80 is supplied to the pipeline system 10 when it does not include a pipeline fault (process block 106). In other words, the online testing system 38B may determine the electrical return signal 82 that is expected to result when the pipeline system 10 exhibits its relatively constant impedance along its length. In particular, in some embodiments, the online testing system 38B may autonomously determine the expected non-faulty electrical return signal 82, for example, at least in part by executing a model of the pipeline system 10. Additionally or alternatively, the online testing system 38B may determine the expected non-faulty electrical return signal 82 based at least in one or more user inputs, for example, received via one or more I/O devices 54 of the control sub-system 40.

Furthermore, the online testing system 38B may determine an electrical return signal 82 that was actually returned via an embedded return wire 78 implemented within the tubing 22 of the pipe segment 20 deployed in the pipeline system 10 (process block 108). As described above, a sensor 43 may be electrically coupled to a return wire 78 embedded in pipe segment tubing 22 and, thus, the sensor 43 may be implemented and/or operated to determine one or more sensor signals 56 indicative of an electrical return signal 82 that is actually received from the embedded return wire 78. In other words, the online testing system 38B may determine the actual electrical return signal 82 based at least in part one or more sensor signals 56 received from the sensor 43.

To facilitate determining the online integrity state of the pipeline system 10, the online testing system 38B may determine whether the actual electrical return signal 82 deviates from the expected non-faulty electrical return signal 82 by more than an error threshold, for example, which facilitates accounting for measurement (e.g., sensor) error (decision block 110). In particular, when the actual electrical return signal 82 does not deviate from the expected non-faulty electrical return signal 82 by more than the error threshold, the online testing system 38B may determine that the integrity state of the pipeline system 10 is a non-faulty state and, thus, indicate as much to a user (e.g., operator), such as a service technician (process block 112). For example, in some such embodiments, the online testing system 38B may instruct an electronic display (e.g., I/O device 54) to display a graphical user interface (GUI) that provides a visual representation of the non-faulty integrity state to the user.

On the other hand, when the actual electrical return signal 82 deviates from the expected non-faulty electrical return signal 82 by more than the error threshold, the online testing system 38B may determine that the integrity state of the pipeline system 10 is a potentially faulty state and, thus, determine one or more expected characteristics of a potential pipeline fault, for example, to facilitate locating and, thus, ameliorating (e.g., fixing) the potential pipeline fault (process block 114). In particular, in some embodiments, determining an expected characteristic of a potential pipeline fault may include determining an expected size of the potential pipeline fault (process block 120). Additionally or alternatively, determining an expected characteristic of a potential pipeline fault may include determining an expected location of the potential pipeline fault (process block 122). Moreover, in some embodiments, the online testing system 38B may determine one or more expected characteristics of a potential pipeline fault based at least in part on the speed with which electrical signals are expected to travel in the pipeline system 10 (e.g., in electrical conductive material implemented in intermediate layer 34 of pipe segment tubing 22 and in embedded return wire 78 included in pipe segment tubing 22)

Figure 10:
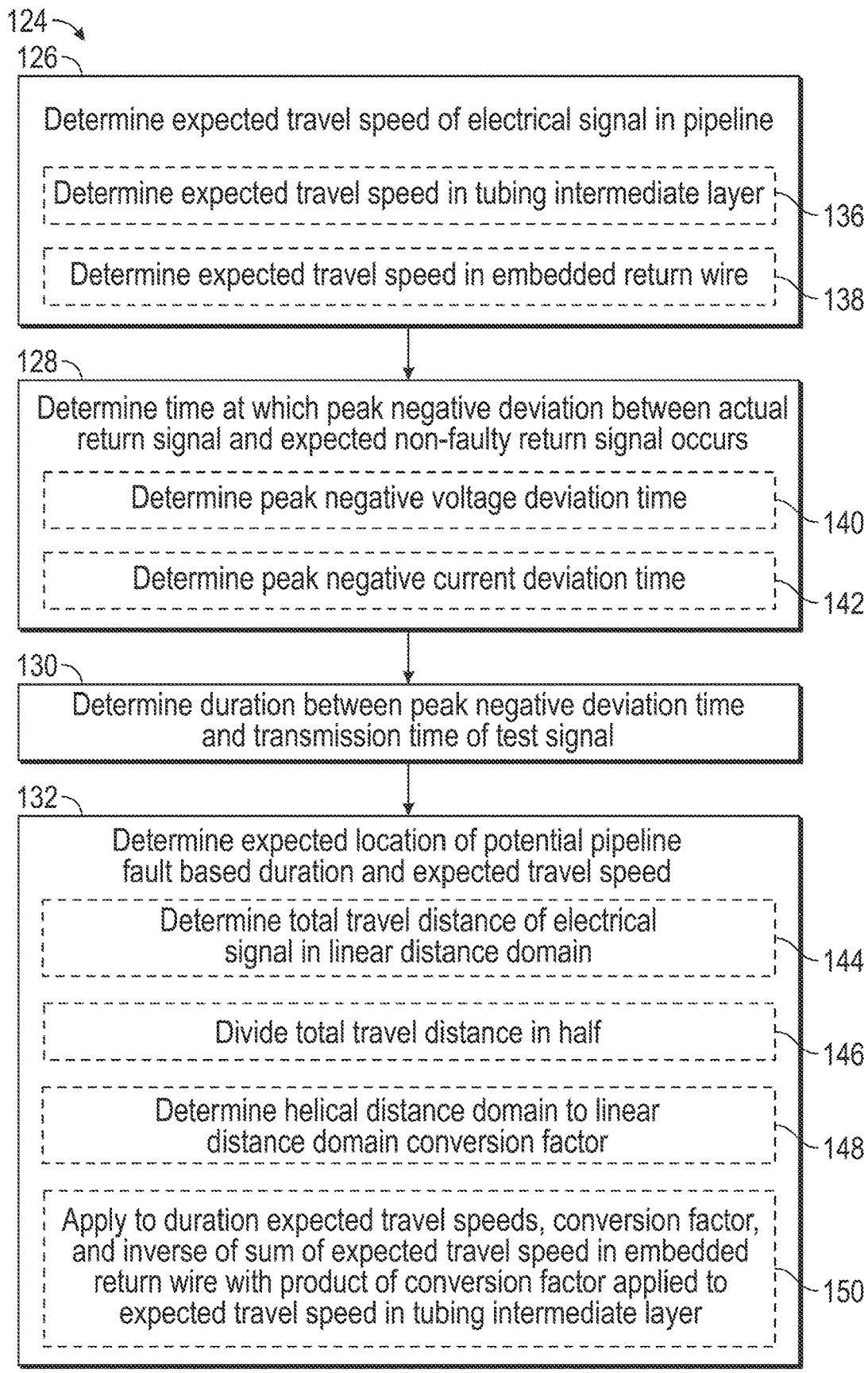
FIG. 10 is a flow diagram of an example process for determining an expected location of a potential pipeline fault in a pipeline system, in accordance with an embodiment of the present disclosure.

To help illustrate, an example of a process 124 for determining an expected location of a potential pipeline fault in a pipeline system 10 is described in FIG. 10. Generally, the process 124 includes determining an expected travel speed of an electrical signal in a pipeline (process block 126) and determining a time at which peak negative deviation between an actual return signal and an expected non-faulty return signal occurs (process block 128). Additionally, the process 124 generally includes determining a duration between the peak negative deviation time and a transmission time of a test signal (process block 130) and determining an expected location of a potential pipeline fault based on the expected travel speed of the electrical signal and the duration between the peak negative deviation time and the transmission time of the test signal (process block 132).

Although described in a specific order, which corresponds with an embodiment of the present disclosure, it should be appreciated that the example process 124 is merely intended to be illustrative and not limiting. In particular, in other embodiments, a process 124 for determining an expected location of a potential pipeline fault may include one or more additional process blocks and/or omit one or more of the depicted process blocks. Additionally or alternatively, in other embodiments, one or more of the depicted process blocks may be performed in a different order, for example, such that the duration between the peak negative deviation time and the transmission time of the test signal is determined before the expected travel speed of the electrical signal. Moreover, in some embodiments, the process 124 may be performed at least in part by executing instructions stored in a tangible, non-transitory, computer-readable medium, such as memory 52 in a control sub-system 40, using processing circuitry, such as a processor 50 in the control sub-system 40.

For example, to facilitate determining an expected location of a potential pipeline fault in a pipeline system 10, in some such embodiments, a control sub-system 40 of an online testing system 38B may determine an expected travel speed of electrical signals in the pipeline system 10 (process block 126). In particular, in some embodiments, the online testing system 38B may autonomously determine the expected travel speed of electrical signals, for example, at least in part by executing a model of the pipeline system 10. Additionally or alternatively, the online testing system 38B may determine the expected travel speed of electrical signals based at least in part on one or more user inputs, for example, received via one or more I/O devices 54 of the control sub-system 40.

As described above, in some embodiments, an intermediate layer 34 of the tubing 22 of a pipe segment 20 deployed in a pipeline system 10 may include electrically conductive material, such as one or more metal (e.g., steel) strips, and an embedded return wire 78 may be implemented within the tubing 22 of the pipe segment 20. In other words, in such embodiments, determining the expected travel speed of electrical signals in the pipeline system 10 may include determining an (e.g., first) expected travel speed of the electrical signal in the electrically conductive material implemented in the intermediate layer 34 of the pipe segment tubing 22 (process block 136) as well as determining an (e.g., second) expected travel speed of the electrical signal in the embedded return wire 78 implemented within the pipe segment tubing 22 (process block 138). Nevertheless, in some embodiment, the expected travel speed of the electrical signal in the electrically conductive material and the expected travel speed of the electrical signal in the embedded return wire 78 may be set in the same value. However, in other embodiments, the expected travel speed of the electrical signal in the electrically conductive material and the expected travel speed of the electrical signal in the embedded return wire 78 may be set as different values, for example, to facilitate accounting for differences in surface area between the electrically conductive material implemented in the intermediate layer 34 of the pipe segment tubing 22 and the embedded return wire 78 implemented within the pipe segment tubing 22.

Additionally, to facilitate determining the expected location of the potential pipeline fault in the pipeline system 10, the online testing system 38B may determine a time at which a peak negative deviation between the actual electrical return signal 82 and the expected non-faulty electrical return signal 82 occurs (process block 128). In other words, the online testing system 38B may compare the actual electrical return signal 82 against the expected non-faulty electrical return signal 82 to determine a peak negative deviation time at which the actual electrical return signal 82 is the largest amount lower than the expected non-faulty electrical return signal 82. In particular, as described above, an electrical impedance that deviates from the relatively constant electrical impedance of non-faulty portions of a pipeline system 10 may occur at the location where a pipeline fault is present in the pipeline system 10. Thus, in some embodiments, determining the peak deviation time may include determining a peak negative voltage deviation time to correspond with when voltage magnitude of the actual electrical return signal 82 is the largest amount lower than the voltage magnitude of the expected non-faulty return signal 82 (process block 140). Additionally or alternatively, determining the peak deviation time may include determining a peak current voltage deviation time to correspond with when current magnitude of the actual electrical return signal 82 is the largest amount lower than the current magnitude of the expected non-faulty return signal 82 (process block 142).

Furthermore, to facilitate determining the expected location of the potential pipeline fault in the pipeline system 10, online testing system 38B may determine a duration between the peak negative deviation time and a transmission time of an electrical test signal 80 that resulted in the actual electrical return signal 82 (process block 130). In other words, the control sub-system 40 may determine a transmission-to-peak negative deviation duration. To facilitate determining the transmission time of the electrical test signal 80, in some embodiments, the electrical test signal 80 may be fed back to a sensor 43 that is communicatively coupled to the control sub-system 40. Thus, in such embodiments, the online testing system 38B may determine the transmission time of the electrical test signal 80 and, thus, the resulting transmission-to-peak negative deviation duration based at least in part on one or more sensor signals 56 received from the sensor 43. Additionally or alternatively, the online testing system 38B may determine the transmission time of the electrical test signal 80 based at least in part on one or more user inputs, for example, received via one or more I/O devices 56 of the control sub-system 40.

Based at least in part on the transmission-to-peak negative deviation duration and one or more expected travel speeds of electrical signals in the pipeline system 10, the online testing system 38B may then determine the expected location of the potential pipeline fault in the pipeline system (process block 132). In particular, to facilitate determining the expected location of the potential pipeline fault, in some embodiments, the online testing system 38B may determine the total distance an electrical signal travels in the pipeline system 10 before being returned and, thus, its contribution to the peak negative deviation that occurred in the actual electrical return signal 82 in a linear distance domain, for example, which follows the length of the pipeline system 10 (process block 144). Merely as an illustrative non-limiting example, when the expected travel speed in electrically conductive material implemented in pipe segment tubing 22 matches the expected travel speed in an embedded return wire 78 implemented in the pipe segment tubing 22 and the length of the embedded return wire 78 implemented in the pipe segment tubing 22 matches the length of the pipe segment tubing 22, the control sub-system 40 may determine the total travel distance of the electrical signal in the linear distance domain at least in part by multiplying the expected travel speed of the electrical signal with the transmission-to-peak negative deviation duration.

Additionally, when the expected travel speed in electrically conductive material implemented in pipe segment tubing 22 deployed in the pipeline system 10 matches the expected travel speed in the embedded return wire 78 implemented in the pipe segment tubing 22 and the length of the embedded return wire 78 implemented in the pipe segment tubing 22 matches the length of the pipe segment tubing 22, in some embodiments, the control sub-system 40 may then divide the total travel distance of the electrical signal in the pipeline system 10 in half to determine the expected location of the potential pipeline fault in the pipeline system 10 (process block 146). In particular, by dividing the total travel distance in half, the control sub-system 40 may determine the distance the electrical signal traveled in the electrically conductive material implemented in one or more intermediate layers 34 of the pipe segment tubing 22 deployed in the pipeline system 10. In other words, in such embodiments, the control sub-system 40 may determine that expected location of the potential pipeline fault is at half the total travel distance away from an end of a pipe segment 20 to which the electrical test signal 80 was supplied.

However, as described above, in other embodiments, the expected travel speed of the electrical signal in the electrically conductive material implemented in an intermediate layer 34 of pipe segment tubing 22 may differ from the expected travel speed of the electrical signal in an embedded return wire 78 implemented in the pipe segment tubing 22. Moreover, as described above, in some embodiments, an embedded return wire 78 implemented in pipe segment tubing 22 deployed in the pipeline system 10 may be helically shaped and, thus, the length of the embedded return wire 78 implemented within the pipe segment tubing 22 may differ (e.g., be greater than) from the length of the pipe segment tubing 22. As such, when the expected travel speed in electrically conductive material implemented in pipe segment tubing 22 deployed in the pipeline system 10 does not match the expected travel speed in the embedded return wire 78 implemented in the pipe segment tubing 22 and/or the length of the embedded return wire 78 implemented in the pipe segment tubing 22 does not match the length of the pipe segment tubing 22, in some embodiments, the control sub-system 40 may determine a helical distance domain-to-linear distance domain conversion factor to facilitate determining the expected location of the potential pipeline fault in the pipeline system 10 (process block 148). In particular, in some such embodiments, the control sub-system 40 may determine the helical distance domain-to-linear distance domain conversion factor at least in part by dividing the length of an embedded return wire 78 implemented within pipe segment tubing 22 by the length of the pipe segment tubing 22.

Additionally, when the expected travel speed in electrically conductive material implemented in an intermediate layer 34 of pipe segment tubing 22 does not match the expected travel speed in the embedded return wire 78 implemented in the pipe segment tubing 22 and/or the length of the embedded return wire 78 implemented in the pipe segment tubing 22 does not match the length of the pipe segment tubing 22, in some embodiments, the control sub-system 40 may then determine the expected location of the potential pipeline fault at least in part by apply the expected travel speed of the electrical signal in the electrically conductive material implemented in the intermediate layer 34 of the pipe segment tubing 22, the expected travel speed of the electrical signal in the embedded return wire 78, the helical distance domain-to-linear distance domain conversion factor, and the inverse of the sum of the expected travel speed of the electrical signal in the embedded return wire 78 and a product of the helical distance domain-to-linear distance domain conversion factor and the expected travel speed of the electrical signal in the electrically conductive material implemented in the intermediate layer 34 of pipe segment tubing 22 to the transmission-to-peak deviation duration (process block 150). In particular, by processing the transmission-to-peak deviation duration in this manner, the control sub-system 40 may determine the distance the electrical signal traveled in the electrically conductive material implemented in one or more intermediate layers 34 of pipe segment tubing 22 deployed in the pipeline system 10. In other words, in such embodiments, the control sub-system 40 may determine that expected location of the potential pipeline fault is the distance the electrical signal traveled in the one or more intermediate layer 34 of the pipe segment tubing 22 away from an end of a pipe segment 20 to which the electrical test signal 80 was supplied. In this manner, a testing system 38 (e.g., online testing system 38B) may operate to facilitate determining an expected location of a potential pipeline fault in a pipeline system 10.

As described above, in some embodiments, an online testing system 38B may additionally or alternatively determine one or more other expected characteristics of a potential pipeline fault in a pipeline system 10 when the online testing system 38B determines that an online integrity state of the pipeline system 10 is a potentially faulty state. For example, as described above, in some embodiments, the online testing system 38B may additionally or alternatively determine an expected size of a potential pipeline fault in the pipeline system 10. In fact, in some embodiments, the online testing system 38B may also determine the expected size of a potential pipeline fault based at least in part on the speed with which electrical signals are expected to travel in the pipeline system 10 (e.g., in electrical conductive material implemented in an intermediate layer 34 of pipe segment tubing 22 and in embedded return wire 78 included in the pipe segment tubing 22).

Figure 11:
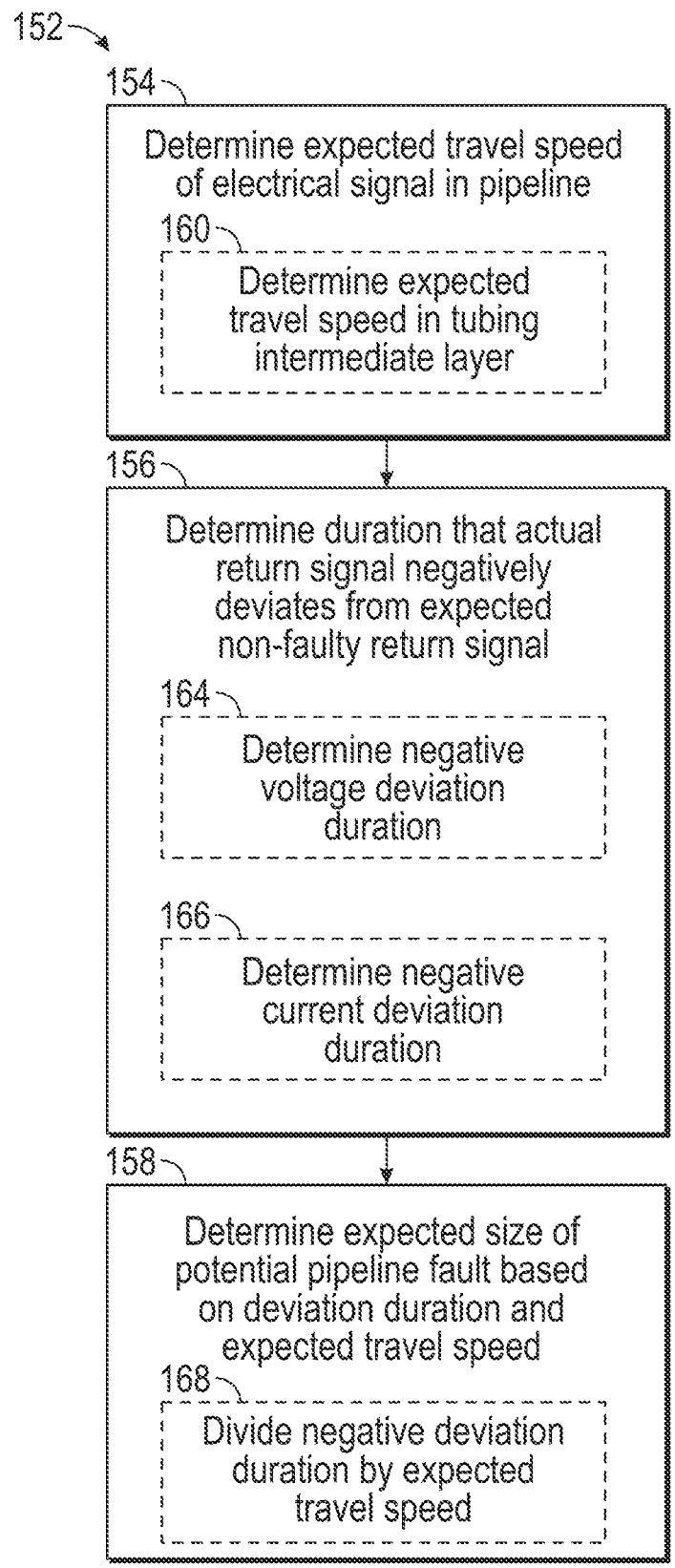
FIG. 11 is flow diagram of an example process for determining an expected size of a potential pipeline fault in a pipeline system, in accordance with an embodiment of the present disclosure.

To help illustrate, an example of a process 152 for determining an expected size of a potential pipeline fault in a pipeline system 10 is described in FIG. 11. Generally, the process 152 includes determining an expected travel speed of an electrical signal in a pipeline (process block 154) and determining a duration that an actual return signal negatively deviates form an expected non-faulty return signal (process block 156). Additionally, the process 152 generally includes determining an expected size of a potential pipeline fault based on the duration that the actual return signal negatively deviates from the expected non-faulty return signal and the expected travel speed of the electrical signal (process block 158).

Although described in a specific order, which corresponds with an embodiment of the present disclosure, it should be appreciated that the example process 152 is merely intended to be illustrative and not limiting. In particular, in other embodiments, a process 152 for determining an expected size of a potential pipeline fault may include one or more additional process blocks and/or omit one or more of the depicted process blocks. Additionally or alternatively, in other embodiments, one or more of the depicted process blocks may be performed in a different order, for example, such that the duration that the actual electrical return signal 82 deviates from the expected non-faulty electrical return signal 82 is determined before the expected travel speed of the electrical signal. Moreover, in some embodiments, the process 152 may be performed at least in part by executing instructions stored in a tangible, non-transitory, computer-readable medium, such as memory 52 in a control sub-system 40, using processing circuitry, such as a processor 50 in the control sub-system 40.

For example, to facilitate determining an expected size of a potential pipeline fault in a pipeline system 10, in some such embodiments, a control sub-system 40 of an online testing system 38B may determine an expected travel speed of electrical signals in the pipeline system 10 (process block 154). In particular, in some embodiments, the online testing system 38B may autonomously determine the expected travel speed of electrical signals, for example, at least in part by executing a model of the pipeline system 10. Additionally or alternatively, the online testing system 38B may determine the expected travel speed of electrical signals based at least in part on one or more user inputs, for example, received via one or more I/O devices 54 of the control sub-system 40.

As described above, in some embodiments, an intermediate layer 34 of the tubing 22 of a pipe segment 20 deployed in a pipeline system 10 may include electrically conductive material, such as one or more metal (e.g., steel) strips, implemented in an intermediate layer 34 of its tubing 22. Additionally, as described above, in some embodiments, an electrical test signal 80 may be supplied to the electrically conductive material implemented in the intermediate layer 34 of the pipe segment tubing 22. Thus, in such embodiments, determining the expected travel speed of electrical signals in the pipeline system 10 may include determining an expected travel speed of the electrical signal in the electrically conductive material implemented in the intermediate layer 34 of the pipe segment tubing 22 (process block 160).

Additionally, to facilitate determining the expected size of the potential pipeline fault in the pipeline system 10, the online testing system 38B may determine the duration an actual electrical return signal 82 negatively deviates from the expected non-faulty electrical return signal (process block 156). In other words, the online testing system 38B may compare the actual electrical return signal 82 against the expected non-faulty electrical return signal 82 to determine a negative deviation duration during which the actual electrical return signal 82 negatively deviates from the expected non-faulty electrical return signal 82. In particular, as described above, an electrical impedance that deviates from the relatively constant electrical impedance of non-faulty portions of a pipeline system 10 may occur at the location where a pipeline fault is present in the pipeline system 10. Thus, in some embodiments, determining the negative deviation duration may include determining a negative voltage deviation duration to correspond with when voltage magnitude of the actual electrical return signal 82 negatively deviates from the voltage magnitude of the expected non-faulty return signal 82 (process block 164). Additionally or alternatively, determining that the negative deviation duration may include determining a negative current deviation duration to correspond with when current magnitude of the actual electrical return signal 82 negatively deviates from the current magnitude of the expected non-faulty return signal 82 (process block 166).

Based at least in part on the negative deviation duration and one or more expected travel speeds of electrical signals in the pipeline system 10, the control sub-system 40 may then determine the expected size of the potential pipeline fault in the pipeline system 10 (process block 158). In particular, in some embodiments, the control sub-system 40 may determine the expected size of the potential pipeline fault in the pipeline system 10 at least in part by dividing the negative deviation duration by the expected travel speed of electrical signals in the pipeline system 10 (process block 168). In this manner, a testing system 38 (e.g., online testing system 38B) may operate to facilitate determining an expected size of a potential pipeline fault in a pipeline system 10.

Returning to the process 102 of FIG. 9, the online testing system 38B may then indicate one or more expected characteristics, such as expected location and/or expected size, of the potential pipeline fault to a user (e.g., operator), such as a service technician, for example, to enable the user to locate and, thus, ameliorate (e.g., fix) the potential fault (process block 116). In particular, in some embodiments, the online testing system 38B may instruct an electronic display (e.g., I/O device 54) to display a graphical user interface (GUI) that provides a visual representation of the one or more expected characteristics of the potential pipeline fault to the user. In some embodiments, the online testing system 38B may also explicitly indicate that the integrity state of the pipeline system 10 is a potentially faulty state (process block 118). For example, in some such embodiments, the online testing system 38B may instruct the electronic display (e.g., I/O device 54) to display a graphical user interface (GUI) that explicitly provides a visual representation of the potentially faulty integrity state to the user. In this manner, the techniques described in the present disclosure may facilitate testing integrity of a pipeline system that includes a pipe segment with an embedded return wire, for example, during operation of the pipeline system, which, at least in some instances, may facilitate further improving operational efficiency and/or operational reliability of the pipeline system.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A method of testing integrity of pipe segment tubing, comprising:
   supplying, using a signal generator, an electrical test signal to electrically conductive material in an intermediate layer of the pipe segment tubing;
   determining, using a sensor, voltage, current, or both of an actual return signal that is returned from a return wire embedded within the pipe segment tubing in response to supply of the electrical test signal to the electrically conductive material in the pipe segment tubing;
   determining, using a control sub-system, an integrity state of the pipe segment tubing based at least in part on the voltage, the current, or both of the actual electrical return signal returned by the return wire; and
   in response to determining that the integrity state of the pipe segment tubing is a faulty state, determining, using the control sub-system, an expected size of a potential fault in the pipe segment tubing based at least in part on:
      an expected travel speed of electrical signals in the pipe segment tubing; and
      a first duration the voltage of the actual electrical return signal is less than voltage of a non-faulty electrical return signal that is expected to be returned in response to supply of the electrical test signal when a fault is not present in the pipe segment tubing or a second duration the current of the actual electrical return signal is less than current of the non-faulty electrical return signal that is expected to be returned in response to supply of the electrical test signal when a fault is not present in the pipe segment tubing.

2. The method of claim 1, wherein determining the integrity state of the pipe segment tubing comprises:
   determining that the integrity state of the pipe segment tubing is a non-faulty state in response to determining that the voltage and the current of the actual electrical return signal do not drop below the voltage and the current of the non-faulty electrical return signal by more than an error threshold that facilitates accounting for measurement error; and determining that the integrity state of the pipe segment tubing is the faulty state in response to determining that the voltage or the current of the actual electrical return signal drops below the voltage or the current of the non-faulty electrical return signal by more than the error threshold.

3. The method of claim 1, wherein determining the expected size of the potential fault in the pipe segment tubing comprises:
dividing the first duration that the voltage of the actual electrical return signal is less than the voltage of the non-faulty electrical return signal by the expected travel speed of electrical signals within the pipe segment tubing; or
dividing the second duration that the current of the actual electrical return signal is less than the current of the non-faulty electrical return signal by the expected travel speed of electrical signals within the pipe segment tubing.

4. The method of claim 1, wherein:
the return wire is embedded within the intermediate layer of the pipe segment tubing; and
the return wire comprises an electrically conductive layer and an electrically insulating layer formed around the electrically conductive layer, wherein:
the electrically conductive layer is configured to return the actual electrical return signal; and
the electrically insulating layer is configured to electrically insulate the electrically conductive layer of the return wire from the electrically conductive material in the intermediate layer of the pipe segment tubing.

5. The method of claim 1, wherein determining the expected size of the potential fault in the pipe segment tubing comprises determining the expected size of the potential fault in the pipe segment tubing based at least in part on:
a first expected travel speed at which electrical signals are expected to travel within the electrically conductive material in the intermediate layer of the pipe segment tubing; and
a second expected travel speed at which electrical signals are expected to travel within the return wire embedded in the pipe segment tubing, wherein the first expected travel speed is faster than the second expected travel speed due to the electrically conductive material in the intermediate layer of the pipe segment tubing having a first surface area that is larger than a second surface area of the return wire.

6. The method of claim 5, wherein:
the return wire is helically embedded within the pipe segment tubing; and
determining the expected size of the potential fault in the pipe segment tubing comprises:
determining a helical domain-to-linear domain conversion factor based on length of the return wire that is present within a length of the pipe segment tubing; and
applying the helical domain-to-linear domain conversion factor to the second expected travel speed at which electrical signals are expected to travel within the return wire to facilitate determining the expected travel speed of electrical signals in the pipe segment tubing.

7. The method of claim 1, comprising, in response to determining that the integrity state of the pipe segment tubing is the faulty state, determining, using the control sub-system, an expected location of the potential fault in the pipe segment tubing based at least in part on:
a first expected travel speed at which electrical signals are expected to travel within the electrically conductive material in the intermediate layer of the pipe segment tubing; and
a second expected travel speed at which electrical signals are expected to travel within the return wire embedded in the pipe segment tubing, wherein the first expected travel speed is faster than the second expected travel speed due to the electrically conductive material in the intermediate layer of the pipe segment tubing having a first surface area that is larger than a second surface area of the return wire.

8. The method of claim 7, wherein:
the return wire is helically embedded within the pipe segment tubing; and
determining the expected location of the potential fault in the pipe segment comprises:
determining a helical domain-to-linear domain conversion factor based on length of the return wire that is present within a length of the pipe segment tubing;
determining a peak negative deviation time at which the voltage of the actual electrical return signal is a largest amount less than the voltage of the non-faulty electrical return signal or the current of the actual electrical return signal is a largest amount less than the current of the non-faulty electrical return signal;
determining a transmission-to-peak negative deviation duration based on a duration between a transmission time of the electrical test signal and the peak negative deviation time; and
determining the expected location of the potential fault in the pipe segment tubing based at least in part on the helical domain-to-linear domain conversion factor, the transmission-to-peak negative deviation duration, the first expected travel speed at which electrical signals are expected to travel within the electrically conductive material in the intermediate layer of the pipe segment tubing, and the second expected travel speed at which electrical signals are expected to travel within the return wire.

9. The method of claim 8, wherein determining the expected location of the potential fault in the pipe segment tubing comprises:
applying the first expected travel speed at which electrical signals are expected to travel within the electrically conductive material in the intermediate layer of the pipe segment tubing to the transmission-to-peak negative deviation duration;
applying the second expected travel speed at which electrical signals are expected to travel within the return wire to the transmission-to-peak negative deviation duration;
applying the helical domain-to-linear domain conversion factor to the transmission-to-peak negative deviation duration; and
applying an inverse of a sum of the second expected travel speed at which electrical signals are expected to travel within the return wire and a product of the helical domain-to-linear domain conversion factor and the first expected travel speed at which electrical signals are expected to travel within the electrically conductive material in the intermediate layer of the pipe segment tubing to the transmission-to-peak negative deviation duration.

10. A tangible, non-transitory, computer-readable medium storing instructions executable by processing circuitry in a control sub-system, wherein the instructions comprise instructions to:
- determine, using the processing circuitry, voltage, current, or both of an actual return signal that is returned from a return wire that is helically embedded within pipe segment tubing in response to an electrical test signal being supplied to electrically conductive material in an intermediate layer of the pipe segment tubing based on sensor data determined by a sensor;
- determine, using the processing circuitry, an integrity state of the pipe segment tubing based at least in part on the voltage, the current, or both of the actual electrical return signal returned from the return wire embedded within the pipe segment tubing; and
- when the integrity state of the pipe segment tubing is a faulty state, determine, using the processing circuitry, an expected characteristic of a potential fault in the pipe segment tubing based at least in part on:
  - a helical domain-to-linear domain conversion factor, wherein the helical domain-to-linear domain conversion factor is determined based on length of the return wire that is present within a length of the pipe segment tubing;
  - the voltage or the current of the actual electrical return signal returned from the return wire; and
  - voltage or current of a non-faulty electrical return signal that is expected to be returned in response to supply of the electrical test signal when a fault is not present in the pipe segment tubing.

11. The tangible, non-transitory, computer-readable medium of claim 10, wherein the instructions to determine the expected characteristic of the potential fault in the pipe segment tubing comprise instructions to determine an expected size of the potential fault in the pipe segment tubing based at least in part on:
- an expected travel speed of electrical signals with the pipe segment tubing; and
- a first duration that the voltage of the actual electrical return signal is less than the voltage of the non-faulty electrical return signal or a second duration that the current of the actual return signal is less than the current of the non-faulty electrical return signal.

12. The tangible, non-transitory, computer-readable medium of claim 11, wherein the instructions to determine the expected size of the potential fault in the pipe segment tubing comprise instructions to determine the expected size of the potential fault in the pipe segment tubing at least in part by:
- dividing the first duration that the voltage of the actual electrical return signal is less than the voltage of the non-faulty electrical return signal by the expected travel speed of electrical signals within the pipe segment tubing; or
- dividing the second duration that the current of the actual electrical return signal is less than the current of the non-faulty electrical return signal by the expected travel speed of electrical signals within the pipe segment tubing.

13. The tangible, non-transitory, computer-readable medium of claim 11, comprising instructions to determine, using the processing circuitry, the expected travel speed of electrical signals within the pipe segment tubing based at least in part on:
- the helical domain-to-linear domain conversion factor;
- a first expected travel speed at which electrical signals are expected to travel within the electrically conductive material in the intermediate layer of the pipe segment tubing; and
- a second expected travel speed at which electrical signals are expected to travel within the return wire embedded in the pipe segment tubing, wherein the first expected travel speed is faster than the second expected travel speed due to the electrically conductive material in the intermediate layer of the pipe segment tubing having a first surface area that is larger than a second surface area of the return wire.

14. The tangible, non-transitory, computer-readable medium of claim 10, wherein the instructions to determine the integrity state of the pipe segment tubing comprise instructions to:
- determine that the integrity state of the pipe segment tubing is a non-faulty state when the voltage and the current of the actual electrical return signal do not drop below the voltage and the current of the non-faulty electrical return signal by more than an error threshold that facilitates accounting for measurement error; and
- determine that the integrity state of the pipe segment tubing is the faulty state when the voltage or the current of the actual electrical return signal drops below the voltage or the current of the non-faulty electrical return signal by more than the error threshold.

15. The tangible, non-transitory, computer-readable medium of claim 10, wherein the instructions to determine the expected characteristic of the potential fault in the pipe segment tubing comprise instructions to determine an expected location of the potential fault in the pipe segment tubing based at least in part on:
- a first expected travel speed at which electrical signals are expected to travel within the electrically conductive material in the intermediate layer of the pipe segment tubing; and
- a second expected travel speed at which electrical signals are expected to travel within the return wire embedded in the pipe segment tubing, wherein the first expected travel speed is faster than the second expected travel speed due to the electrically conductive material in the intermediate layer of the pipe segment tubing having a first surface area that is larger than a second surface area of the return wire.

16. The tangible, non-transitory, computer-readable medium of claim 15, wherein the instructions to determine the expected location of the potential fault in the pipe segment tubing comprise instructions to:
- determine a peak negative deviation time at which the voltage of the actual electrical return signal is a largest amount less than the voltage of the non-faulty electrical return signal or the current of the actual electrical return signal is a largest amount less than the current of the non-faulty electrical return signal;
- determine a transmission-to-peak negative deviation duration based on a duration between a transmission time of the electrical test signal and the peak negative deviation time; and
- determine the expected location of the potential fault in the pipe segment tubing based at least in part on the helical domain-to-linear domain conversion factor, the transmission-to-peak negative deviation duration, the first expected travel speed at which electrical signals are expected to travel within the electrically conductive material in the intermediate layer of the pipe segment tubing, and the second expected travel speed at which electrical signals are expected to travel within the return wire.

17. The tangible, non-transitory, computer-readable medium of claim 16, wherein the instructions to determine the expected location of the potential fault in the pipe segment tubing comprise instructions to:
apply the first expected travel speed at which electrical signals are expected to travel within the electrically conductive material in the intermediate layer of the pipe segment tubing to the transmission-to-peak negative deviation duration;
apply the second expected travel speed at which electrical signals are expected to travel within the return wire to the transmission-to-peak negative deviation duration;
apply the helical domain-to-linear domain conversion factor to the transmission-to-peak negative deviation duration; and
apply an inverse of a sum of the second expected travel speed at which electrical signals are expected to travel within the return wire and a product of the helical domain-to-linear domain conversion factor and the first expected travel speed at which electrical signals are expected to travel within the electrically conductive material in the intermediate layer of the pipe segment tubing to the transmission-to-peak negative deviation duration.

18. The tangible, non-transitory, computer-readable medium of claim 10, wherein:
the return wire is embedded within the intermediate layer of the pipe segment tubing; and
the return wire comprises an electrically conductive layer and an electrically insulating layer formed around the electrically conductive layer to facilitate electrically insulating the electrically conductive layer of the return wire from the electrically conductive material in the intermediate layer of the pipe segment tubing.

* * * * *